US011294996B2

(12) United States Patent
Rowe et al.

(10) Patent No.: US 11,294,996 B2
(45) Date of Patent: Apr. 5, 2022

(54) SYSTEMS AND METHODS FOR USING MACHINE LEARNING FOR IMAGE-BASED SPOOF DETECTION

(71) Applicant: ASSA ABLOY AB, Stockholm (SE)

(72) Inventors: Robert Kjell Rowe, Corrales, NM (US); Nathaniel I. Matter, Cedar Crest, NM (US); Ryan Eric Martin, Tijeras, NM (US); Horst Arnold Mueller, Rio Rancho, NM (US)

(73) Assignee: ASSA ABLOY AB, Stockholm (SE)

( * ) Notice: Subject to any disclaimer, the term of this patent is extended or adjusted under 35 U.S.C. 154(b) by 102 days.

(21) Appl. No.: 16/601,851

(22) Filed: Oct. 15, 2019

(65) Prior Publication Data

US 2021/0110018 A1    Apr. 15, 2021

(51) Int. Cl.
*G06F 21/32* (2013.01)
*G06K 9/00* (2006.01)
(Continued)

(52) U.S. Cl.
CPC ......... *G06F 21/32* (2013.01); *G06K 9/00899* (2013.01); *G06N 3/0454* (2013.01);
(Continued)

(58) Field of Classification Search
CPC ............ G06F 21/32; G06K 9/00288; G06K 9/00899; G06K 9/6271; G06K 9/6256;
(Continued)

(56) References Cited

U.S. PATENT DOCUMENTS 8,437,513 B1    5/2013  Derakhshani et al.
9,607,138 B1 *  3/2017  Baldwin .................. G06F 21/32
(Continued)

FOREIGN PATENT DOCUMENTS

EP          2506189      10/2012
WO    WO-2019152983 A2   8/2019
(Continued)

OTHER PUBLICATIONS

Wang et al. ("Exploiting temporal and depth information for multi-frame face anti-spoofing," arXiv:1811.05118; Mar. 5, 2019) (Year: 2019).*

(Continued)

*Primary Examiner* — Yubin Hung
(74) *Attorney, Agent, or Firm* — Schwegman Lundberg & Woessner, P.A.

(57) ABSTRACT

Disclosed herein are systems and methods for using machine learning for image-based spoof detection. One embodiment takes the form of a method that includes obtaining an input-data set that includes a plurality of images captured of a biometric-authentication subject by a plurality of cameras of a camera system. The method also includes inputting the input-data set into a trained machine-learning module, and processing the input-data set using the machine-learning module to obtain, from the machine-learning module, a spoof-detection result for the biometric-authentication subject. The method also includes outputting the spoof-detection result for the biometric-authentication subject.

14 Claims, 10 Drawing Sheets

(51) Int. Cl.
| | |
|---|---|
| *G06N 3/04* | (2006.01) |
| *G06T 7/00* | (2017.01) |
| *G06N 20/00* | (2019.01) |
| *G06K 9/62* | (2022.01) |

(52) U.S. Cl.
CPC .............. *G06N 20/00* (2019.01); *G06T 7/97* (2017.01); *G06K 9/6256* (2013.01); *G06T 2207/10012* (2013.01)

(58) Field of Classification Search
CPC ........ G06N 3/0454; G06N 20/00; G06T 7/09; G06T 2207/10012; G06T 7/97
See application file for complete search history.

(56) References Cited

U.S. PATENT DOCUMENTS

| | | | |
|---|---|---|---|
| 2006/0062438 A1* | 3/2006 | Rowe | G06K 9/00046 382/124 |
| 2006/0078323 A1 | 4/2006 | Nakahara | |
| 2008/0158612 A1 | 7/2008 | Iwasaki | |
| 2016/0163053 A1 | 6/2016 | Tang et al. | |
| 2017/0076145 A1 | 3/2017 | Gottemukkula et al. | |
| 2017/0180348 A1 | 6/2017 | Piccolotto et al. | |
| 2017/0323507 A1 | 11/2017 | Masuda et al. | |
| 2017/0344793 A1 | 11/2017 | Xue et al. | |
| 2017/0345146 A1* | 11/2017 | Fan | G06K 9/00228 |
| 2017/0351929 A1 | 12/2017 | Kim | |
| 2018/0025217 A1* | 1/2018 | Chandraker | G06F 21/6218 382/118 |
| 2018/0025244 A1 | 1/2018 | Bohl et al. | |
| 2019/0026957 A1 | 1/2019 | Gausebeck | |
| 2019/0139206 A1* | 5/2019 | Derakhshani | G06T 5/50 |
| 2019/0205622 A1* | 7/2019 | Hong | G06T 7/593 |
| 2019/0213816 A1* | 7/2019 | Grigorov | H04N 5/33 |
| 2019/0286885 A1 | 9/2019 | Liu | |
| 2019/0356905 A1 | 11/2019 | Godard et al. | |
| 2019/0373186 A1 | 12/2019 | Egea et al. | |
| 2020/0026941 A1 | 1/2020 | Tan et al. | |
| 2020/0082160 A1* | 3/2020 | Li | G06N 3/02 |
| 2020/0134342 A1* | 4/2020 | Parupati | G06F 21/32 |
| 2020/0210738 A1* | 7/2020 | Parupati | G06K 9/00288 |
| 2020/0226777 A1 | 7/2020 | Luo et al. | |
| 2020/0334894 A1 | 10/2020 | Long et al. | |
| 2021/0064901 A1 | 3/2021 | Vorobiev et al. | |
| 2021/0110185 A1 | 4/2021 | Rowe | |

FOREIGN PATENT DOCUMENTS

| | | |
|---|---|---|
| WO | WO-2021074032 A1 | 4/2021 |
| WO | WO-2021074034 A1 | 4/2021 |

OTHER PUBLICATIONS

Martino et al. ("Liveness Detection Using Implicit 3D Features," arXiv:1804.06702; Apr. 19, 2018) (Year: 2018).*
Zhong et al. ("Open-World Stereo Video Matching with Deep RNN," arXiv:1808.03959; Aug. 12, 2018) (Year: 2018).*
Pang et al. ("Cascade Residual Learning: A Two-Stage Convolutional Neural Network for Stereo Matching," IEEE International Conference on Computer Vision Workshops; Date of Conference: Oct. 22-29, 2017) (Year: 2017).*
U.S. Appl. No. 16/601,839, filed Oct. 15, 2019, Systems and Methods for Using Focal Stacks for Image-Based Spoof Detection.
U.S. Appl. No. 16/922,456, filed Jul. 7, 2020, Systems and Methods for Enrollment in a Multispectral Stereo Facial Recognition System.
"International Application Serial No. PCT/EP2020/078413, International Search Report dated Jan. 27, 2021", 4 pgs.
"International Application Serial No. PCT/EP2020/078413, Written Opinion dated Jan. 27, 2021", 7 pgs.
"International Application Serial No. PCT/EP2020/078426, International Search Report dated Jan. 21, 2021", 4 pgs.
"International Application Serial No. PCT/EP2020/078426, Written Opinion dated Jan. 21, 2021", 6 pgs.
Das, Abhijit, "Recent Advances in Biometric Technology for Mobile Devices", IEEE 9th International Conference on Biometrics Theory, Applications and Systems (BTAS), (Oct. 22, 2018), 11 pgs.
Ebihara, Akinori F, "Specular- and Diffuse-reflection-based Face Liveness Detection for Mobile Devices", arXiv.1907.12400v1 [cs. CV], Cornell University Library, Ithaca, NY, (Jul. 29, 2019), 10 pgs.
Feng, Litong, "Integration of image quality and motion cues for face anti-spoofing: A neural network approach", Journal of Visual Communication and Image Representation, Academic Press, Inc, US, vol. 38, (Apr. 2016), 451-460.
Rehman, Yasar Abbas Ur, "SLNet: Stereo face liveness detection via dynamic disparity-maps and convolutional neural network", Expert Systems With Applications, Oxford, GB, vol. 142, (Oct. 5, 2019), 12 pgs.
Sooyeon, Kim, "Face Liveness Detection Using Defocus", Sensors, vol. 15, No. 1, (Jan. 14, 2015), 1537-1563.
"U.S. Appl. No. 16/601,839, Non Final Office Action dated May 27, 2021", 23 pgs.
"U.S. Appl. No. 16/601,839, Response filed Jul. 15, 2021 to Non Final Office Action dated May 27, 2021", 10 pgs.
"U.S. Appl. No. 16/922,456, Non Final Office Action dated Jun. 18, 2021", 18 pgs.
Husseis, et al., "A Survey in Presentation Attack and Presentation Attack Detection", International Carnahan Conference on Security Technology, (Oct. 1-3, 2019).
Kim, et al., "Face liveness detection using variable focusing", IEEE Biometrics Compendium, (Jun. 4-7, 2013).
Raja, et al., "Robust face presentation attack detection on smartphones: An approach based on variable focus", IEEE International Joint Conference on Biometrics (IJCB), (Oct. 1-4, 2017).
"International Application Serial No. PCT/EP2021/068617, International Search Report dated Oct. 12, 2021", 4 pgs.
"International Application Serial No. PCT/EP2021/068617, Written Opinion dated Oct. 12, 2021", 5 pgs.
"U.S. Appl. No. 16/601,839, Final Office Action dated Oct. 20, 2021", 26 pgs.
"U.S. Appl. No. 16/922,456, Response filed Oct. 18, 2021 to Non Final Office Action dated Jun. 18, 2021", 11 pgs.
"U.S. Appl. No. 16/922,456, Notice of Allowance dated Nov. 4, 2021", 9 pgs.
Czajka, Adam, "Presentation attack detection for iris recognition—an assessment of the state of the art", arXiv:1804.00194v3, (Jun. 13, 2018), 35 pgs.
Sohn, Kihyuk, "Unsupervised Domain Adaptation for Face Recognition in Unlabeled Videos", 2017 IEEE International Conference on Computer Vision (ICCV), (Oct. 1, 2017), 5917-5925.
Zhao, Yunhan, "Stretching Domain Adaptation: How far is too far?", ARXIV.ORG, Cornell University Library, 201 Olin Library Cornell University Ithaca, NY 14853, (Dec. 6, 2017), 8 pgs.

* cited by examiner

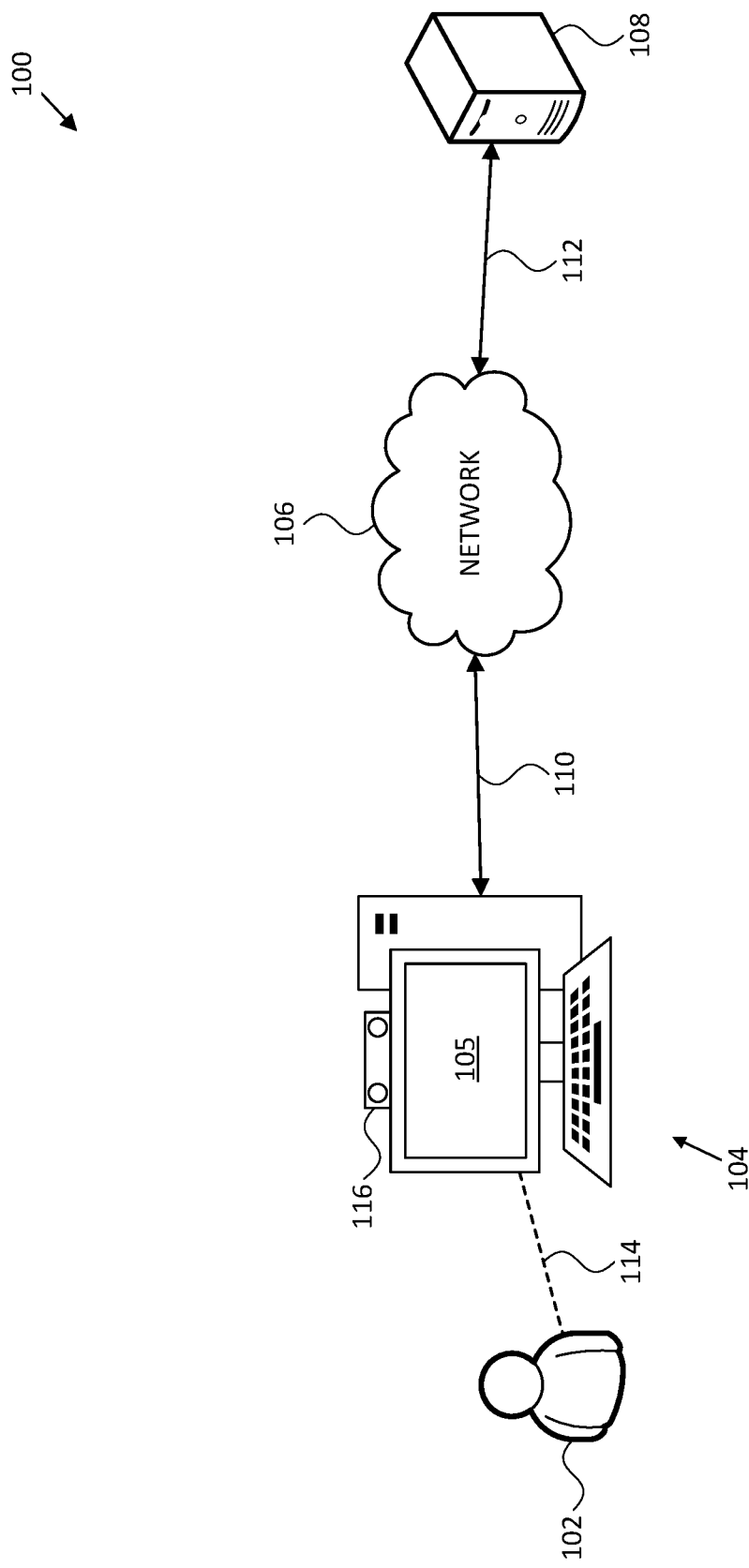

SYSTEMS AND METHODS FOR USING MACHINE LEARNING FOR IMAGE-BASED SPOOF DETECTION

CROSS REFERENCE TO RELATED APPLICATIONS

This application is being filed on even date with another U.S. patent application, which is entitled "Systems and Methods for Using Focal Stacks for Image-Based Spoof Detection", which is hereby incorporated herein by reference in its entirety.

TECHNICAL FIELD

Embodiments of the present disclosure relate generally to biometric recognition, authentication, and spoof detection, and more specifically to systems and methods for using machine learning for image-based spoof detection.

BACKGROUND

As technology becomes increasingly pervasive in modern society, so too do illicit attempts to access systems such as personal computers, mobile devices, web servers, network servers, and the like. Often such systems are protected using biometric-authentication systems, which are used to verify that an authorized user is present in a specific context. Biometric-authentication systems, however, can be vulnerable to the presentation of two-dimensional (2D) and/or three-dimensional (3D) representations of one or more biometrics (e.g., face, fingerprint, etc.) of an authorized user. Such access attempts are known as spoofing. The detection of such attempts is known as spoof detection, and is also known as presentation attack detection (PAD) and liveness detection, perhaps among other names.

As an example, with respect to biometric authentication that involves facial authentication, spoofing attempts often involve the presentation of a 2D or 3D representation of an authorized user's face (or another face) to a camera system—that has a single camera or multiple cameras—of a given system (e.g., a mobile device) in the hopes that the system will incorrectly determine that the representation of the authorized user's face is the authorized user's actual face, and responsively grant access to the system (e.g., unlock the mobile device). In such a context, spoof detection typically involves attempting to determine whether a subject being presented for authentication is a living, unaltered face as opposed to, as examples, a printed-out or screen-displayed picture of a face, a 3D model of a face, a 3D mask of a face, a face to which one or more prosthetic alterations have been made, or the like.

With respect to determining whether or not biometric-authentication (e.g., facial-authentication) attempts are spoofing attempts, systems generally try to avoid or at least minimize the occurrence of both false negatives and false positives. In this context, a false negative is an incorrect determination that an actual spoofing attempt is not a spoofing attempt—e.g., an incorrect determination that a 2D or 3D representation of a face is a real, unaltered face. Conversely, a false positive is an incorrect determination that a non-spoofing authentication attempt is a spoofing attempt—e.g., an incorrect determination that a real, unaltered face (that incidentally may or may not belong to an authorized user) is in fact merely a 2D or 3D representation of a face. On the one hand, false negatives can result in granting system access to unauthorized parties. On the other hand, false positives can result in denying system access to authorized parties. There is accordingly a need for increased accuracy in image-based biometric spoof detection, including in the context of image-based facial authentication.

Overview

Disclosed herein are systems and methods for using machine learning for image-based spoof detection.

One embodiment takes the form of a method that includes obtaining an input-data set that includes a plurality of images captured of a biometric-authentication subject by a camera system. The method also includes inputting the input-data set into a trained machine-learning module, as well as processing the input-data set using the machine-learning module to obtain, from the machine-learning module, a spoof-detection result for the biometric-authentication subject. The method also includes outputting the spoof-detection result for the biometric-authentication subject.

Another embodiment takes the form of a system that includes a trained machine-learning module, a processor, and data storage that contains instructions executable by the processor for carrying out at least the functions listed in the preceding paragraph. Still another embodiment takes the form of a computer-readable medium containing instructions executable by a processor for carrying out at least those functions.

Furthermore, a number of variations and permutations of the above-listed embodiments are described herein, and it is noted that any variation or permutation that is described in this disclosure can be implemented with respect to any type of embodiment. For example, a variation or permutation that is primarily described in this disclosure in connection with a method embodiment can just as well be implemented in connection with a system embodiment and/or a computer-readable-medium embodiment. Furthermore, this flexibility and cross-applicability of embodiments is present in spite of any slightly different language (e.g., process, method, steps, functions, sets of functions, and/or the like) that is used to describe and/or characterize such embodiments.

BRIEF DESCRIPTION OF THE DRAWINGS

A more detailed understanding may be had from the following description, which is presented by way of example in conjunction with the following drawings, in which like reference numerals are used across the drawings in connection with like elements.

FIG. 1 is a diagram of an example communication context in which at least one embodiment can be carried out, the communication context including an example computer system that is coupled with an example camera system, in accordance with at least one embodiment.

DETAILED DESCRIPTION

I. Introduction

Figure 2A:
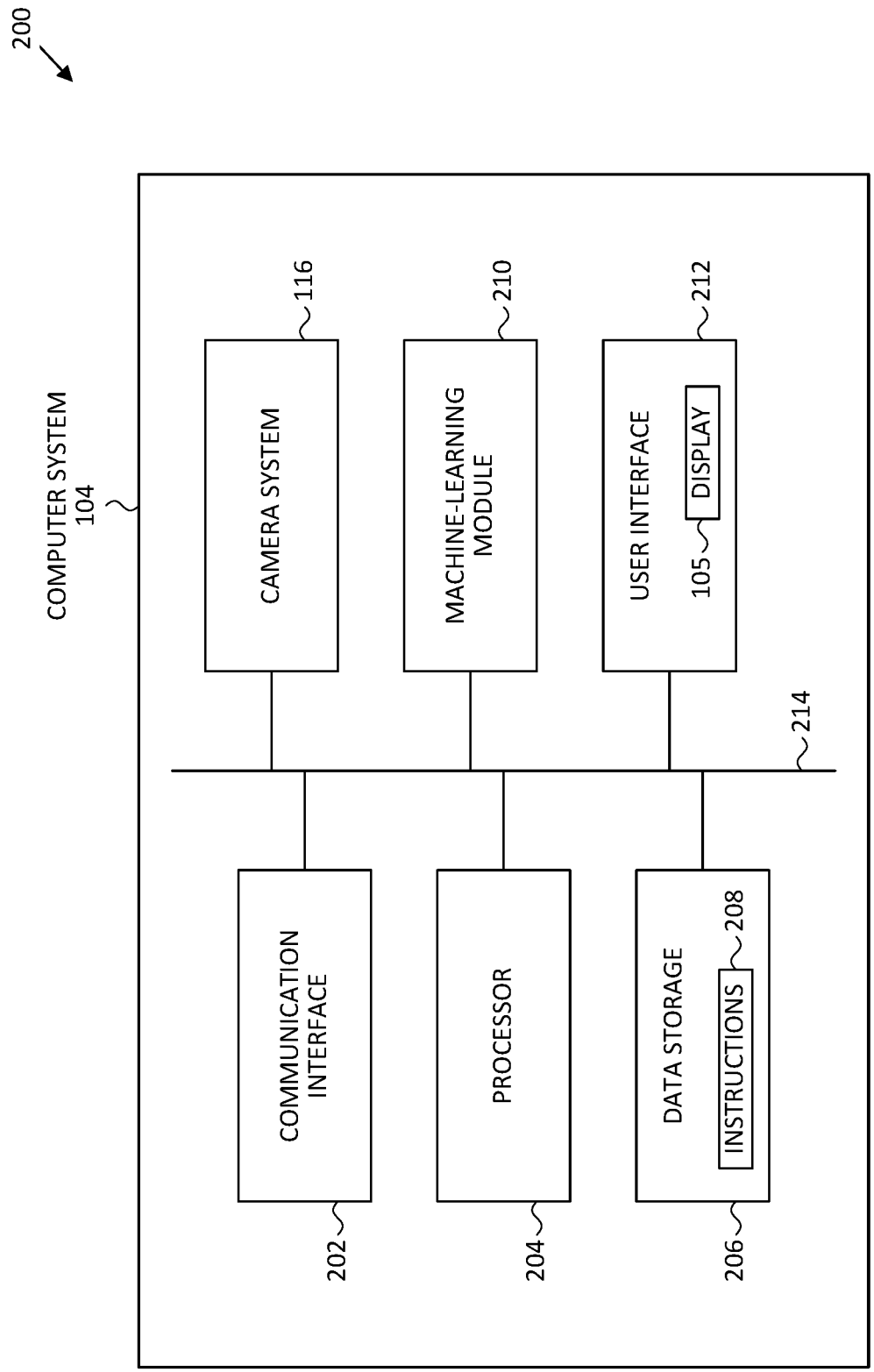
FIG. 2A is a diagram of a first example architecture of the computer system of FIG. 1, in accordance with at least one embodiment.

To promote an understanding of the principles of the present disclosure, reference is made below to embodiments that are illustrated in the drawings. The embodiments disclosed herein are not intended to be exhaustive or to limit the present disclosure to the precise forms that are disclosed in the following detailed description. Rather, the described embodiments have been selected so that others skilled in the art may utilize their teachings. Accordingly, no limitation of the scope of the present disclosure is thereby intended.

In any instances in this disclosure, including in the claims, in which numeric modifiers such as first, second, and third are used in reference to components, data (e.g., values, identifiers, parameters, and/or the like), and/or any other elements, such use of such modifiers is not intended to denote or dictate any specific or required order of the so-referenced elements. Rather, any such use of such modifiers is intended to assist the reader in distinguishing any elements that are referenced in this manner from one another, and should not be interpreted as insisting upon any particular order or carrying any other significance, unless such an order or other significance is clearly and affirmatively explained herein.

Moreover, consistent with the fact that the entities and arrangements that are described herein, including the entities and arrangements that are depicted in and described in connection with the drawings, are presented as examples and not by way of limitation, any and all statements or other indications as to what a particular drawing "depicts," what a particular element or entity in a particular drawing or otherwise mentioned in this disclosure "is" or "has," and any and all similar statements that are not explicitly self-qualifying by way of a clause such as "In at least one embodiment," and that could therefore be read in isolation and out of context as absolute and thus as a limitation on all embodiments, can only properly be read as being constructively qualified by such a clause. It is for reasons akin to brevity and clarity of presentation that this implied qualifying clause is not repeated ad nauseum in this disclosure.

Furthermore, in this disclosure, one or more components of one or more devices, systems, and/or the like are referred to as modules that carry out (i.e., perform, execute, and the like) various functions. As used in the present disclosure, a module includes both hardware and instructions. The hardware can include one or more processors, one or more microprocessors, one or more microcontrollers, one or more microchips, one or more application-specific integrated circuits (ASICs), one or more field programmable gate arrays (FPGAs), one or more graphical processing units (GPUs), one or more tensor processing units (TPUs), and/or one or more devices and/or components of any other type deemed suitable by those of skill in the art for a given implementation. In some cases, a module includes at least one functional component (e.g., an application or part of an application, a block of code, and/or the like) executing in whole or in part on one or more processors of a host system or device.

The instructions for a given module are executable by the hardware for carrying out the one or more herein-described functions of the module, and can include hardware (e.g., hardwired) instructions, firmware, software, and/or the like, stored in any one or more non-transitory computer-readable media deemed suitable by those of skill in the art for a given implementation. Each such computer-readable medium can be or include memory (e.g., random access memory (RAM), read-only memory (ROM), erasable programmable read-only memory (EPROM), electrically erasable programmable read-only memory (EEPROM a.k.a. EPROM), flash memory, and/or one or more other types of memory) and/or one or more other types of non-transitory computer-readable medium. A module can be realized as a single component or be distributed across multiple components as deemed suitable by those of skill in the art.

II. Example Architecture

FIG. 1 is a diagram of a communication context 100 in which at least one embodiment of the present systems and methods can be carried out. As shown in FIG. 1, the communication context 100 includes a computer system 104 that is associated (as indicated generally at 114) with a user 102. The computer system 104 has a display 105, and is coupled (via, e.g., a universal serial bus (USB) connection (not shown)) with a camera system 116. Furthermore, the computer system 104 is communicatively connected with a network 106 via a communication link 110. The communication context 100 also includes a server 108 that is communicatively connected with the network 106 via a communication link 112. The types and respective numbers of entities that are depicted in FIG. 1 are provided by way of example and not limitation. Other types and respective numbers of entities can be present in other instances.

The user 102 may be associated (114) with the computer system 104 by ownership, lease, account subscription, and/or by any other type of association. In the herein-described examples, the user 102 is an authorized user of the computer system 104. In one example, the computer system 104 is a computer system that the user 102 has purchased for personal use. The user 102 may go through a configuration or set-up sequence with the computer system 104, where that sequence includes the computer system 104 using the camera system 116 to capture one or more images of the face of the user 102, and then storing those one or more images. The computer system 104 may be arranged to thereafter unlock itself for use by the user 102 upon successful authentication of the user 102's face. The user 102 may present their face in front of the computer system 104, in the field of view of the camera system 116, to initiate such an operation. The computer system 104 is described in additional detail below, including in connection with FIG. 2A and FIG. 2B.

Furthermore, while it is in the case that, in some embodiments, successful authentication of the user 102 results in unlocking the computer system 104 itself, it is also contemplated that successful authentication of the user 102 via the computer system 104 could result in the granting of access to one or more other protected assets, such as a secured entryway, a secured computing device other than the computer system 104, and/or the like. This could be instead of or in addition to successful authentication resulting in the granting of access to the computer system 104 itself.

The camera system 116 can, as described above, be coupled with the computer system 104 via a data connection such as a USB connection. In other embodiments, other types of connections can be used (e.g., Bluetooth). In some cases, the camera system 116 is an embedded component of the computer system 104 or of a peripheral device such as an external monitor. These are just a few examples, as other arrangements can be used as well. The camera system 116 can include a single camera or multiple cameras. Each camera in the camera system 116 can be arranged to be capable of capturing images and/or video. In at least one embodiment, the camera system 116 includes at least one camera capable of capturing images. In some embodiments, the camera system 116 includes multiple cameras capable of capturing images.

Any of the one or more cameras in the camera system 116 can be arranged to capture images in a visible-light spectrum, an infrared-light spectrum (e.g., a near-infrared-light spectrum), an ultraviolet-light spectrum (e.g., a near-ultraviolet-light spectrum), and/or a wideband spectrum, as examples. A wideband spectrum can include both an ultraviolet-light spectrum and a visible-light spectrum, both a visible-light spectrum and an infrared-light spectrum, or all three of an ultraviolet-light spectrum, a visible-light spectrum, and an infrared-light spectrum, as examples. An example architecture 300 of the camera system 208 is depicted in and described below in connection with FIG. 3.

The network 106 can be or include any one or more types of networks (e.g., data networks). Some example types of networks that the network 106 can be or include are Internet Protocol (IP) networks such as the Internet, private data networks, public data networks, telephone networks, local area networks (LANs), wide area networks (WANs), wireless wide area networks (WWANs), personal area networks (PANs), and/or the like.

As used herein, a communication link (e.g., the communication link 110 and/or the communication link 112) can be or include one or more wired-communication (e.g., Ethernet) links and/or one or more wireless-communication (e.g., LTE, Wi-Fi, etc.) links. Furthermore a communication link can include one or more intermediate devices such as routers, bridges, gateways, network access servers (NASs), and/or the like. The server 108 can be any system of one or more servers arranged to provide any sort of one or more services. As examples, the server 108 can be or include a web server, an account-management server, an authentication server, and/or the like.

Moreover, it is noted that at least some embodiments of the present disclosure can be carried out entirely on and/or by a single system or device such as the computer system 104, and that, with respect to such embodiments, the communication context 100 (including the network 106 and the server 108) is provided to show an example context in which the computer system 104 may be arranged to operate as a general matter. Also, the description herein of embodiments being carried out on or by a computer system such as the computer system 104 are also provided by way of example. Various embodiments of the present systems and methods can be carried out on or by any type of system (e.g., a mobile device that may have an embedded camera system) that is suitably equipped, programmed, and configured to carry out the herein-described functions that are primarily described in this disclosure as being carried out on the computer system 104.

Figure 2B:
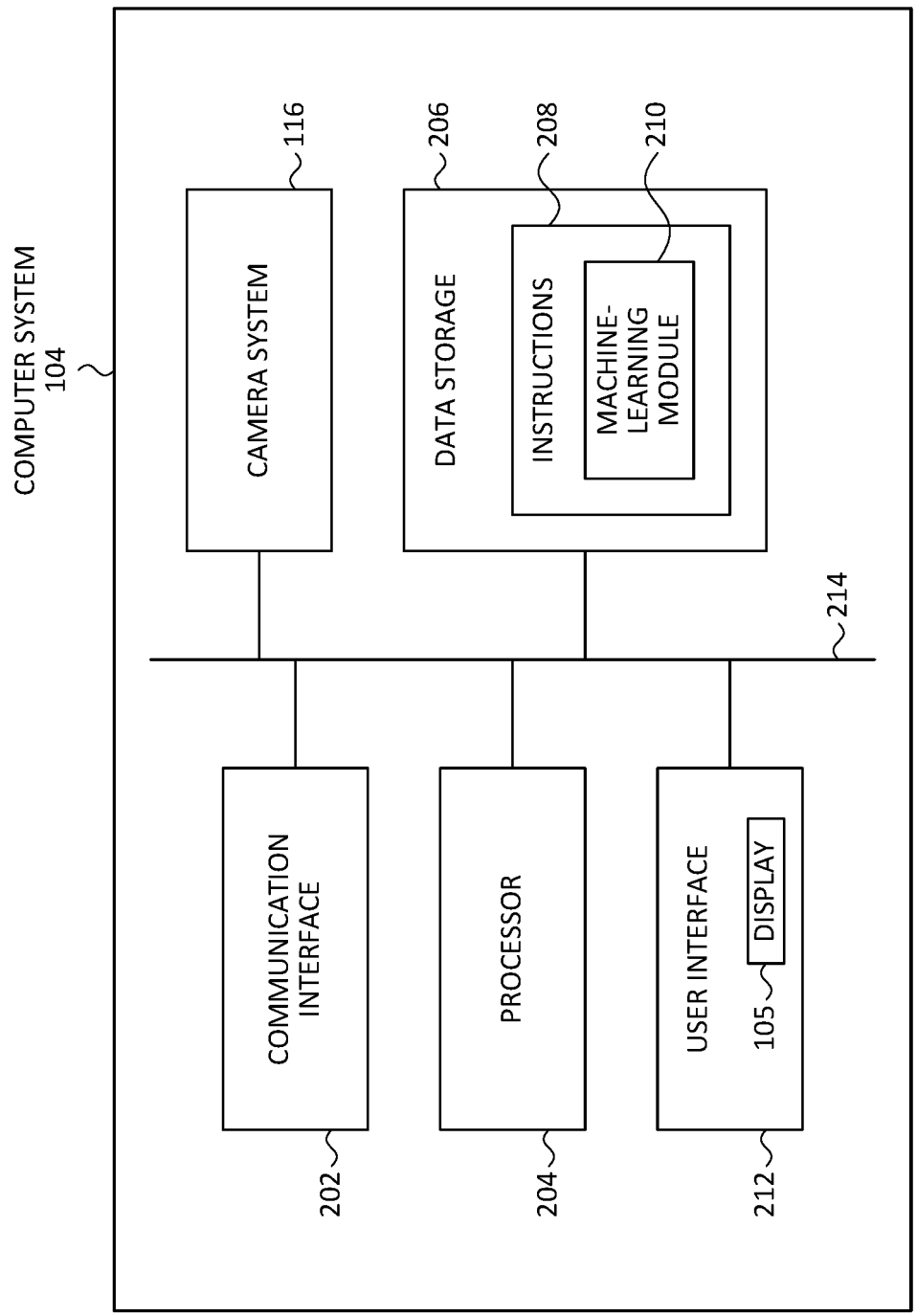
FIG. 2B is a diagram of a second example architecture of the computer system of FIG. 1, in accordance with at least one embodiment.

FIG. 2A and FIG. 2B are simplified block diagrams of an example architecture 200 and an example architecture 250, respectively, of the computer system 104. The architecture 200 and the architecture 250 are presented by way of example and not limitation. The computer system 104 can have various different architectures in various different embodiments. Some elements that are depicted in FIG. 2A as being part of the architecture 200 and/or in FIG. 2B as being part of the architecture 250 can be omitted in some embodiments. Moreover, additional elements can be present. Furthermore, one or more of the depicted elements can be distributed across multiple functional components, while two or more of the depicted components can be combined into a lesser number of components.

As depicted in the example architecture 200 of FIG. 2A, the computer system 104 includes the camera system 116, a communication interface 202, a processor 204, a data storage 206, a machine-learning module 210, and a user interface 212, all of which are communicatively connected via a system bus 214. The camera system 116 is depicted in FIG. 2A as being communicatively connected to the system bus 214. That connection can be by way of the camera system 116 being an embedded component of the computer system 104 or being coupled to the computer system 104 by way of, e.g., a USB or other type of data connection.

The communication interface 202 can include one or more wireless-communication interfaces (for communicating according to, e.g., LTE, Wi-Fi, Bluetooth, and/or the like) and/or one or more wired-communication interfaces (for communicating according to, e.g., Ethernet, USB, and/or the like). As such, the communication interface 202 may include any necessary hardware (e.g., chipsets, antennas, Ethernet cards, etc.), any necessary firmware, and any necessary software for conducting one or more forms of communication with one or more other entities.

The processor 204 may include one or more processors of any type deemed suitable by those of skill in the relevant art, some examples including a general-purpose microprocessor and a dedicated digital signal processor (DSP). The processor 204 can include one or more microprocessors, one or more microcontrollers, one or more microchips, one or more ASICs, one or more FPGAs, one or more GPUs, one or more TPUs, and/or one or more processing devices and/or processing components of any other type.

The data storage 206 may take the form of any non-transitory computer-readable medium or combination of such media, some examples including flash memory, ROM, and RAM to name but a few, as any one or more types of non-transitory data-storage technology deemed suitable by those of skill in the relevant art can be used. In at least one embodiment, the data storage 206 contains instructions 208 that are executable by the processor 204 for carrying out various functions described herein as being carried out on or by the computer system 104. As described below, in at least some embodiments, the instructions 208 include an application executable by the processor 204 to carry out such functions.

The machine-learning module 210 can be realized as or on a distinct processing device or as a functional component executing on the processor 204, as examples. In some cases, the machine-learning module 210 is implemented on an ASIC, FPGA, or the like. The machine-learning module 210 can be programmed with hardwired instructions, firmware, and/or software to carry out the functions described herein as being carried out by the machine-learning module 210. In some embodiments, the machine-learning module 210 includes one or more neural networks. Examples of the functionality of the machine-learning module 210 in various different embodiments are described throughout this disclosure.

In FIG. 2A, the machine-learning module 210 is depicted as being a component that is in communication with the system bus 214 of the computer system 104. This is one example implementation. In other embodiments, the machine-learning module 210 is implemented as software executing on the processor 204. As an example, as depicted in the example architecture 250 of FIG. 2B, the machine-learning module 210 could be a functional part of an application corresponding to the instructions 208. As a general matter, the machine-learning module 210 can be implemented using any one or any combination of software executing on hardware, firmware executing on hardware, and/or hardware deemed suitable by those of skill in the art for a given implementation.

The user interface 212 may include one or more input devices (a.k.a. components and the like) and one or more output devices (a.k.a. components and the like). With respect to input devices, the user interface 212 may include one or more touchscreens, keyboards, mice, trackpads, touchpads, other pointing devices, buttons, switches, knobs, microphones, and/or the like. With respect to output devices, the user interface 212 may include one or more displays (e.g., the display 105), monitors, speakers, light-emitting diodes (LEDs), and/or the like. Moreover, one or more components of the user interface 212 could provide both user-input and user-output functionality. For example, the display 105 could be an interactive touchscreen-and-display component.

Figure 3:
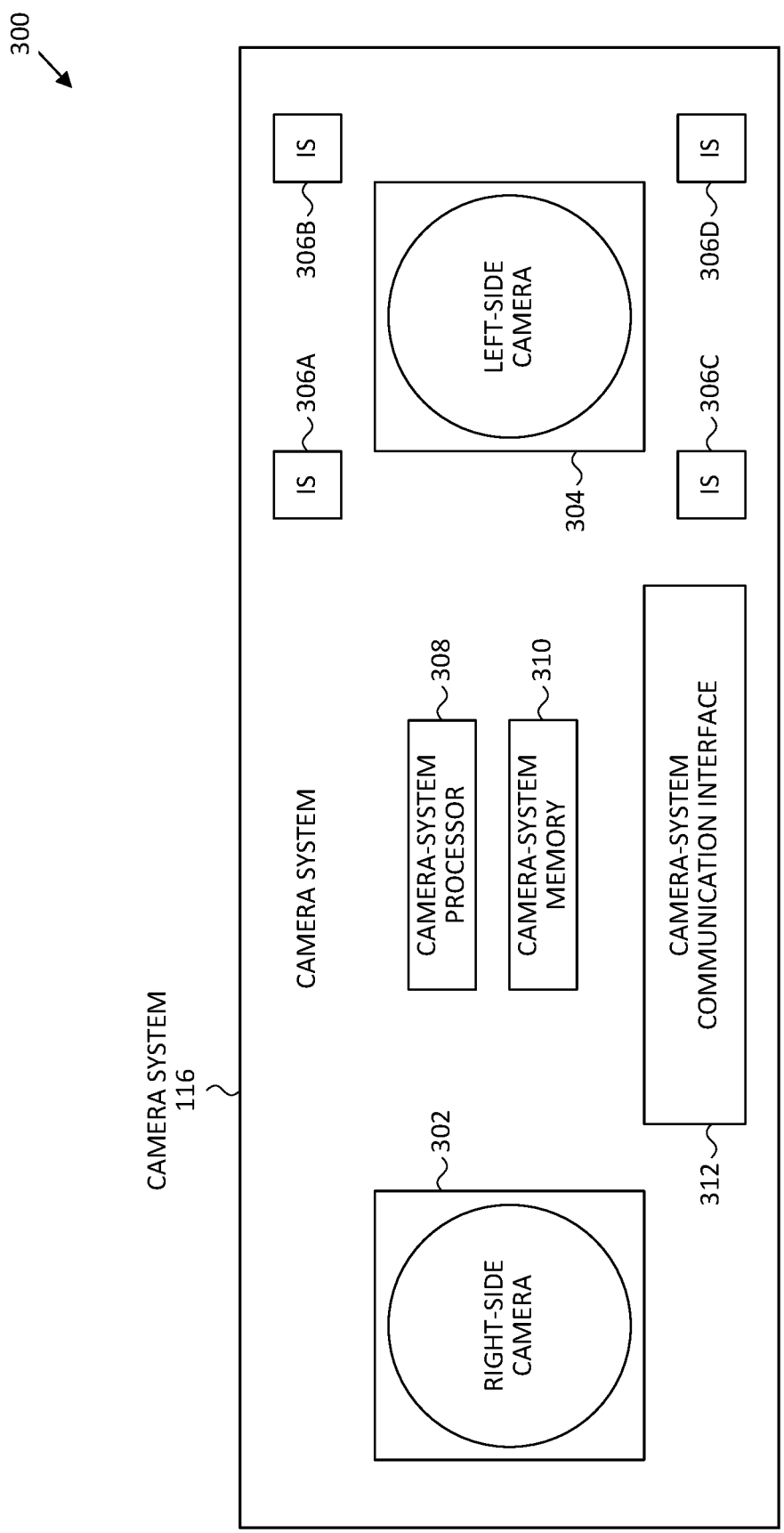
FIG. 3 is a diagram of an example architecture of the camera system of FIG. 1, in accordance with at least one embodiment.

FIG. 3 depicts an example architecture 300 of the camera system 116. The architecture 300 is presented by way of example and not limitation. The camera system 116 can have various different architectures in various different embodiments. Some elements that are depicted in FIG. 3 as being part of the architecture 300 can be omitted in some embodiments. Moreover, additional elements can be present. Furthermore, one or more of the depicted elements can be distributed across multiple functional components, while two or more of the depicted components can be combined into a lesser number of components.

As depicted in the example architecture 300 of FIG. 3, the camera system 116 includes a right-side camera 302, a left-side camera 304, an illumination source 306A, an illumination source 306B, an illumination source 306C, an illumination source 306D, a camera-system processor 308, a camera-system memory 310, and a camera-system communication interface 312. Moreover, it is noted that the depiction in FIG. 3 of the camera system 116 as including two cameras is by way of example and not limitation. In some embodiments, the camera system 116 includes more than two cameras. In other embodiments, the camera system 116 is a single-camera system. The camera system 116 can be a mobile-device camera system, such as a smartphone dual-camera module. In embodiments in which the camera system 116 includes multiple cameras, those cameras could operate synchronously or asynchronously with respect to one another.

The view of the camera system 116 that is depicted in FIG. 3 is one in which the camera system 116 is facing the reader—i.e., the reader would be in the field of view of the camera system 116. As such, the right-side camera 302 appears on the left side of the camera system 116 as shown in FIG. 3, and the left-side camera 304 appears on the right side of the camera system 116 as shown in FIG. 3. As a general matter, the right-side camera 302 is configured to capture a right-camera view of a subject (e.g., a biometric-authentication subject), whereas the left-side camera 304 is configured to capture a left-camera view of the same subject. The right-side camera 302 and the left-side camera 304 can be the same type of camera as one another or be two different types of cameras. In at least one embodiment, each of the right-side camera 302 and the left-side camera 304 is implemented using complementary metal-oxide-semiconductor (CMOS) active-pixel sensors (APSs).

In some embodiments, the right-side camera 302 and the left-side camera 304 are configured to capture images in the same light spectrum as one another. Some example light spectrums include an ultraviolet-light spectrum ("UV spectrum") (e.g., a near-UV spectrum), a visible-light spectrum ("visible spectrum"), and an infrared-light spectrum ("IR spectrum") (e.g., a near-IR spectrum). It is noted that, as used herein, near-UV and near-IR refer to portions of the UV and IR spectrums, respectively, that substantially border the visible spectrum, which spans from wavelengths of about 400 nanometers (nm) to about 750 nm. The UV spectrum spans from wavelengths of about 1 nm to about 400 nm, with what is referred to herein as the near-UV spectrum being on the upper end of that range (e.g., about 200 nm to about 400 nm). The IR spectrum spans from wavelengths of about 750 nm to about 2.5 micrometers (μm) (a.k.a. microns), with what is referred to herein as the near-IR spectrum being on the lower end of that range. In some embodiments, the near-IR spectrum spans from about 750 nm to about 950 nm, about 1.1 microns, about 1.2 microns, or about 1.3 microns, as examples. As used herein, a given camera being configured to capture images in a given light spectrum could mean either that the camera can capture light in some or all of the given spectrum.

Further example light spectrums include the above-mentioned wideband light spectrums, which span a substantially contiguous combination of two or more light spectrums. One example wideband light spectrum, referred to herein as the UV/visible wideband, spans both the near-UV spectrum and the visible spectrum. Another example wideband light spectrum, referred to herein as the visible/IR wideband, spans both the visible spectrum and the near-IR spectrum. Still another example wideband light spectrum, referred to herein as the UV/visible/IR wideband, spans all three of the near-UV spectrum, the visible spectrum, and the near-IR spectrum. The UV/visible wideband could span some or all of the UV (e.g., near-UV) spectrum and some or all of the visible spectrum. Similarly, the visible/IR wideband could span some or all of the visible spectrum and some or all of the IR (e.g., near-IR) spectrum. Lastly, the UV/visible/IR wideband could span some or all of each of the UV (e.g., near-UV) spectrum, the visible spectrum, and the IR (e.g., near-IR) spectrum. Other examples could be listed here as well. For example, in some embodiments, any wavelength or group of wavelengths between ~300 nm and ~1100 nm could be used. There could be overlapping bands, there could be a mix of discrete wavelengths and continuous bands, and/or the like.

In some embodiments, the right-side camera 302 is configured to capture images in one light spectrum, and the left-side camera 304 is configured to capture images is a different light spectrum. These two light spectrums can be overlapping or nonoverlapping. Each light spectrum can be any of the individual or wideband spectrums mentioned above, as examples. In one embodiment, the right-side camera 302 is configured to capture images in the visible spectrum, and the left-side camera 304 is configured to capture images in the visible/IR wideband. In some such embodiments, the right-side camera 302 and the left-side camera 304 are similar visible-light (e.g., RGB) cameras where an IR-blocking filter has been removed from one of them—e.g., from the left-side camera 304. In another embodiment, the right-side camera 302 and the left-side camera 304 are similar visible-light (e.g., RGB) cameras where one of the two—e.g., the left-side camera 304—further includes a filter that blocks visible light and passes IR light; in such an embodiment, the left-side camera 304 is configured to captured images that are substantially monochrome IR images.

Various types of filters can be used in various different embodiments on one or both of the right-side camera 302 and the left-side camera 304. One or more of such filters can be an optical filter. Another option are what are known as hot mirrors and cold mirrors. Hot mirrors generally pass longer wavelengths and block shorter wavelengths, whereas cold mirrors generally pass shorter wavelengths and block longer wavelengths. As examples, a hot mirror could pass IR light and block visible light, and a cold mirror could do the opposite.

As a general matter, the right-side camera 302 can be configured to capture images in any individual or wideband light spectrum. Furthermore, the left-side camera 304 can likewise be configured to capture images in any individual or wideband light spectrum. Moreover, these two light spectrums can be the same as one another or different from one another. When different from one another, the two light spectrums can be overlapping or nonoverlapping.

As such, according to the present disclosure, a multispectral stereo camera system—that includes two cameras such as the right-side camera 302 and the left-side camera 304—can be configured with a wide variety of spectral configurations. It is noted that example configurations in which one or both of the right-side camera 302 and the left-side camera 304 are arranged to capture images in the IR spectrum (perhaps only in the IR spectrum, or perhaps as part of a wideband spectrum) are helpful in detecting spoof attempts in which a 2D image of a face is displayed on a smartphone, tablet, or the like and then held up to the camera system 116 in an authentication attempt. Digital displays on smartphones, tablets, and the like tend to have greatly reduced emissions in the IR spectrum. As such, spoofing attempts that involve the use of such displays often result in dim or dark images being captured in the IR spectrum.

Moreover, in an example configuration, one of the two cameras—e.g., the right-side camera 302—is configured to capture images in the visible/IR wideband, and the other of the two cameras—i.e., the left-side camera 304—is configured to capture images in the IR spectrum. Such configurations are helpful in a range of use cases that preserve information important for spoof detection. However, depending on the source of any illumination, the visible/IR-wideband images can have markedly different characteristics, which neural networks as disclosed herein can be trained to pick up on. In a variation on this configuration, it is also possible that, instead of capturing images in the IR spectrum, the left-side camera 304 includes a monochrome imager without a color filter array; this configuration may be used if no discrimination among visible wavelengths is needed from the left-side camera 304. In another example configuration, the camera system 116 includes a monochrome imager without an IR-blocking filter. In still another example configuration, the camera system 116 includes a monochrome imager with an IR-pass filter (e.g., visible-blocking filter, long-pass filter, or the like).

In at least some instances, the combination of having separate cameras capturing images in the visible/IR wideband and in the IR spectrum enables the neural network (e.g., the neural network 510) to isolate the contribution to the ambient environment made by visible light, which can be beneficial in conducting spoof detection. In at least some embodiments, both such cameras are used in environments that are ambiently dark and in which IR illumination is being used, retaining stereo information. Moreover, in at least some embodiments, both cameras are used under most ambient-lighting scenarios.

In some embodiments in which separate cameras in the camera system 116 are configured to capture images in the visible/IR wideband and the IR spectrum, respectively, a long-pass optical filter is implemented on one of those cameras. The long-pass filter allows at least some significant portion of visible light to pass and be detected. Such a configuration can be useful under fluorescent lighting and/or white-light-LED lighting, both of which tend to have minimal energy at wavelengths above 700 nm. In one example configuration, the camera system 116 includes a camera configured to capture images in the visible/IR wideband and also includes a separate camera that is a wideband imager, where the wideband imager includes a long-pass cutoff filter (e.g., a 600-nm long-pass cutoff filter). In at least one embodiment, a wideband imager is an imager that acquires images having spectral content that spans two or more spectral regions (e.g., two or more of the UV spectrum, the visible spectrum, and the IR spectrum). With respect to this definition and others provided herein by way of example in connection with other terms and/or phrases, it should be understood that any general and conventional understandings of the defined terms or phrases are intended to be included as well as definitions of such terms or phrases in some embodiments.

Some configurations have at least one camera that conducts panchromatic imaging, which in at least one embodiment is defined as an imaging mode that considers all captured light to belong to a single spectral category, wavelength range, spectral region, spectrum, and/or the like (i.e., an imaging mode that does not distinguish between different spectral content). It is noted that embodiments that are described herein as involving monochrome images or imagers could instead or in addition involve panchromatic images or imagers.

Moreover, some configurations include one or more cameras that conduct multispectral imaging, which in at least one embodiment is defined as an imaging mode that distinguishes and categorizes captured light into at least two (and perhaps more) different spectral categories, wavelength ranges, spectral regions, spectra, and/or the like. As an example of multispectral imaging, color imaging in the visible spectrum is often performed using a color filter array deposited on top of a broad-band imaging material such a silicon. One type of color filter array is an RGB Bayer pattern that includes red, green and blue filters. Another is an RGBI color filter array, which includes an infrared filter in addition to red, green, and blue. Other variations of color filter arrays and other means for multispectral imaging are known in the art. It is noted that embodiments that are described herein as involving color images or imagers could instead or in addition involve multispectral images or imagers.

In some example embodiments, one or more cameras conduct mixed-mode imaging, which in at least one embodiment is defined as a mode of imaging in which (i) light with certain spectral content is separated into separate spectral categories and used to generate a multispectral image and (ii) light with other spectral content is acquired and used to generate a panchromatic image. An example of this is a color imager that uses an RGB color filter array. Such color filter arrays can become ineffective in the near-IR spectrum, and pass near-IR light through each of the red, green, and blue color-filter-array filter elements. In the absence of an IR-blocking (a.k.a. short-pass) filter, IR light incident on the color filter array and imager can affect each of the red, green, and blue pixels.

Some configurations involve one camera capturing images in the visible spectrum and the other capturing images in the visible/IR wideband. This can help isolate the IR contribution in the ambient environment. In this configuration, however, in at least some embodiments, only the visible/IR-wideband camera is active in an environments that are ambiently dark and in which IR illumination is being used, so stereo information may not be retained.

Another configuration in which stereo information may not be retained is one in which one camera captures images in the visible spectrum and the other captures images in the IR spectrum. In most optical environments, in at least some embodiments, only one of the two cameras may be active.

Another possible configuration is one in which both cameras capture images in the IR spectrum. Such a configuration, in at least some embodiments, can work in most optical environments. In ambiently dark environments, IR illumination may be used as described below. This is an example of a matched stereo configuration, as are configurations in which both cameras capture images in the visible spectrum and in which both cameras capture images in the visible/IR wideband.

The illumination sources 306A-D are collectively referred to herein at times as the illumination sources 306, and can be collectively considered to be a single illuminator in some embodiments and can individually be considered to be separate illuminators in some embodiments. The illumination sources 306 can be configured to emit any type of light in any spectrum according to any pattern, any timing, and/or any other parameter. In some embodiments, the illumination sources 306 emit IR light. In at least one such embodiment, the illumination sources 306 are near-IR light-emitting diodes (LEDs). In some embodiments, the illumination sources 306 emit visible light. The illumination sources 306 can be configured to emit UV light. Furthermore, although the architecture 300 depicts illumination sources in connection with the left-side camera 304 and not the right-side camera 302, in some embodiments there are illumination sources associated (e.g., positioned proximate to, around, and/or the like) the right-side camera 302. As examples, the illumination sources 306 can be configured to produce illumination in one or more discrete wavelengths (e.g., laser), illumination that is narrowband (e.g., the illumination sources 306 could include one or more monochrome LEDs), and/or illumination that is broadband (e.g., the illumination sources 306 could include one or more incandescent-illumination sources, fluorescent-illumination sources, white-light LEDs, and/or the like).

In some embodiments, the illumination sources 306 are configured to emit patterns of structured light. As an example, the patterns could include geometric lines and/or shapes (e.g., triangles, squares, and/or the like). The structured light could include patterns such as bright and dark bands, checkerboards, scattered dots, or other such non-uniform illumination patterns. The structured light could be in the IR spectrum, as an example. Other non-visible wavelengths may be used instead or in addition in embodiments in which the camera system 116 includes cameras configured to capture such light.

In some embodiments, the illumination sources 306 are configured to be able to emit visible light. Such functionality is used in some embodiments in order to illuminate the biometric-authentication subject in one or more (e.g., a sequence of) illumination states, as described below. In some embodiments, the visible light emitted by the illumination sources 306 includes broad-spectrum white light. In at least one embodiment, the visible light may be pulsed on and off at a rate above what is known as a flicker-fusion frequency of humans (so that it appears to the biometric-authentication subject to be constantly on) but at a slow enough rate that one or more of the cameras of the camera system 116 can collect separate images with the illumination on and off.

Moreover, in some embodiments, the illumination sources 306 are configured to emit polarized light having a first polarization orientation. In such embodiments, the left-side camera 304 could be configured to capture images using a second polarization orientation that is different from the first polarization orientation. Thus, in embodiments that use active illumination, one or more of the illumination states may use optically polarized light, and one or more cameras of the camera system 116 may be differentially sensitive to the optical polarization of the reflected light. Such polarization orientations could be linear-polarization orientations or circular-polarization orientations, as examples. In the case of linear polarization, one or more of the illumination sources 306 may incorporate a linear polarizer, and one or more of the cameras—e.g., the left-side camera 304—may incorporate another linear polarizer oriented at an angle relative to the linear polarizer incorporated into one or more of the illumination sources 306. In the case of circular polarization, one or more of the illumination sources 306 may incorporate a left-handed circular polarizer, and one or more of the cameras—e.g., the left-side camera 304—may incorporate a right-handed circular polarizer.

The camera-system processor 308 can be or include one or more processors of any type deemed suitable by those of skill in the relevant art, some examples including a general-purpose microprocessor and a dedicated DSP. The camera-system processor 308 can include one or more microprocessors, one or more microcontrollers, one or more microchips, one or more ASICs, one or more FPGAs, one or more GPUs, one or more TPUs, and/or one or more processing devices and/or processing components of any other type.

The camera-system memory 310 can be or include any type of RAM, ROM, flash memory, and/or the like deemed suitable by those of skill in the art for a given implementation.

The camera-system communication interface 312 can include one or more wireless-communication interfaces (for communicating according to, e.g., LTE, Wi-Fi, Bluetooth, and/or the like) and/or one or more wired-communication interfaces (for communicating according to, e.g., Ethernet, USB (e.g., USB 2.0), and/or the like). As such, the camera-system communication interface 312 may include any necessary hardware (e.g., chipsets, antennas, Ethernet cards, etc.), any necessary firmware, and any necessary software for conducting one or more forms of communication with one or more other entities.

III. Example Operation

Figure 4:
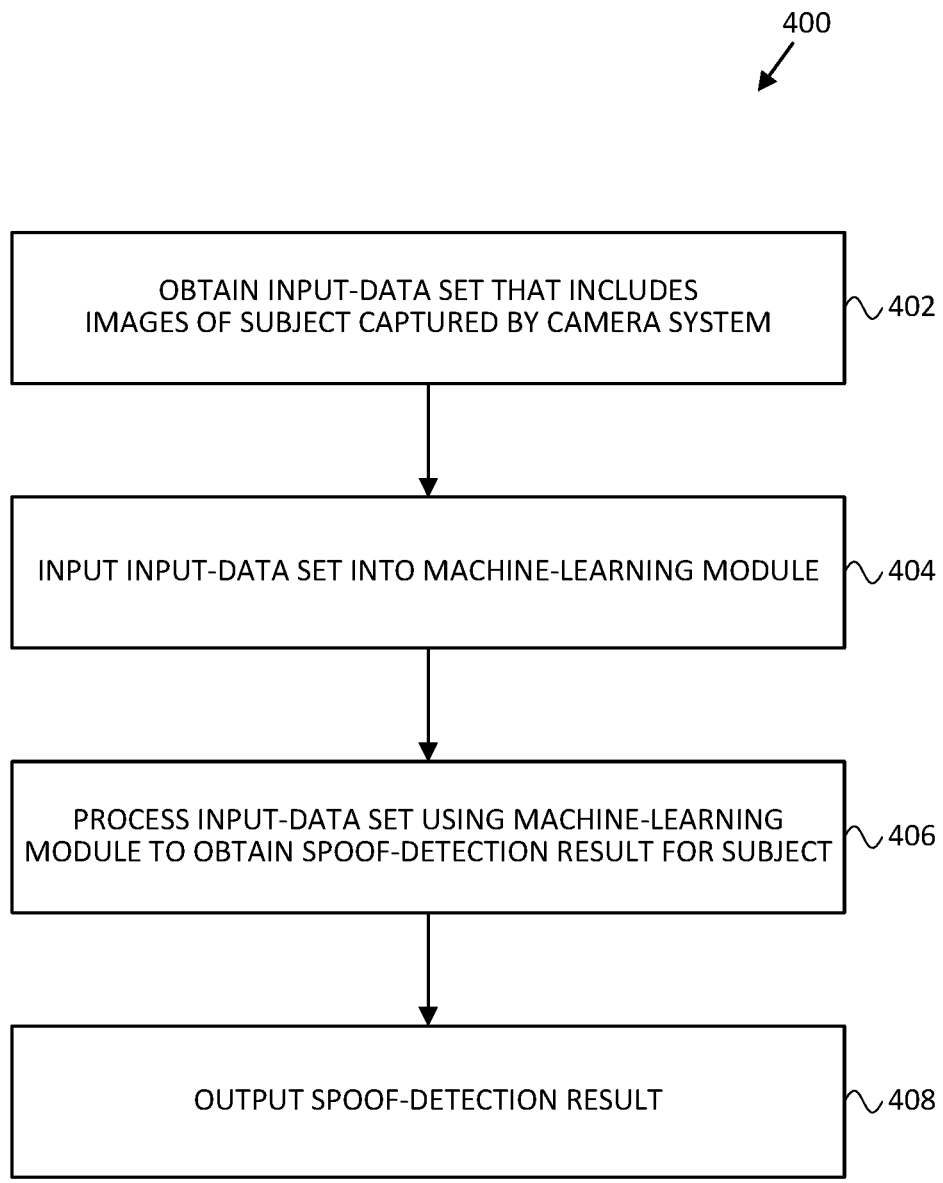
FIG. 4 is a flowchart of an example method, in accordance with at least one embodiment.

FIG. 4 is a flowchart of a method 400, which is described herein by way of example as being carried out by the computer system 104. In other embodiments, the method 400 can be carried out by any system or device that is suitably equipped, programmed, and configured to carry out the method 400. In this description, the method 400 is described as being carried by the computer system 104 using the processor 204 to execute the instructions 208. Where applicable, other example components of the example architecture 200 of the computer system 104, as well as of the camera system 116, are described as well in connection with one or more of the steps of the method 400. The description of the method 400 as being carried out by the mobile device 104 is for simplicity of presentation—as stated above, in at least one embodiment, the instructions 208 include an application that is executing on the computer system 104 to carry out the method 400.

The 400 begins at step 402, at which the computer system 104 obtains an input-data set that includes a plurality of images captured of a biometric-authentication subject by the camera system 116. At step 404, the computer system 104 inputs the input-data set into the machine-learning module 210, which has previously been trained using training data. At step 406, the computer system 104 processes the input-data set using the machine-learning module 210 to obtain, from the machine-learning module 210, a spoof-detection result for the biometric-authentication subject. At step 408, the computer system 104 outputs the spoof-detection result for the biometric-authentication subject. Each of these steps is described in turn below.

As stated above, at step 402, the computer system 104 obtains an input-data set that includes a plurality of images captured of a biometric-authentication subject by the camera system 116. In some cases, the biometric-authentication subject is related to a spoofing attempt and is a 2D or 3D representation of a face such as the face of the user 102, who is an authorized user of the computer system 104. In other cases, the biometric-authentication subject is a real, unaltered, live human face that may or may not belong to the user 102. In the balance of this description, the term "spoof specimen" is used at times as shorthand for a 2D or 3D representation of the face of the user 102 that is being used in a given spoofing attempt. Furthermore, the term "real face" is used at times to refer to a real, unaltered, live human face that is used in a given facial-authentication attempt. Spoof specimens and real faces are both examples of biometric-authentication subjects as that term is used herein.

In some embodiments, step 402 involves the computer system 104 transmitting instructions to the camera system 116 to capture the plurality of images of the biometric-authentication subject, perhaps doing so by making use of an application programming interface (API) or the like. In such embodiments, these instructions to the camera system 116 may instruct the camera system 116 to capture different images in the plurality of images using different cameras, different camera settings, different illumination configurations, and/or varying one or more other different aspects of image capture as described herein.

The images in the plurality of images can come in a wide variety of configurations. The images could be from a single camera or from multiple different cameras in the camera system 116. The images could be in a common light spectrum or in different light spectrums, any one of which could be any of the light spectrums mentioned herein or any other suitable light spectrum. The images could be still images or video frames, as examples. In embodiments that use video frames, the plurality of images could include one or more pairs of time-synchronized images captured from multiple different cameras in the camera system 116. Numerous other permutations are described below and throughout this disclosure.

In at least one embodiment, the right-side camera 302 and the left-side camera 304 are both configured to capture images in a common light spectrum, and the plurality of images in the input-data set includes at least one image captured by the right-side camera 302 and at least one image captured by the left-side camera 304. In another embodiment, the right-side camera 302 is configured to capture images in a first light spectrum and the left-side camera 304 is configured to capture images in a second light spectrum that is different than the first light spectrum. The first and second light spectrums could be overlapping or nonoverlapping. In at least one such embodiment, the plurality of images in the input-data set includes at least one image captured by the right-side camera 302 in the first light spectrum and at least one image captured by the left-side camera 304 in the second light spectrum.

The plurality of images can include one or more images captured by the camera system 116 with the biometric-authentication subject under illumination of structured light from the illumination sources 306. In some cases, multiple different images in the plurality of images are captured with the biometric-authentication subject under illumination of different illumination geometries (e.g., patterns) using structured light in different configurations. Some example patterns include bright and dark bands, checkerboards, random or pseudorandom dots, or other such non-uniform illumination patterns. The structured light can come from a single illumination source or from multiple different illumination sources.

In some embodiments, multiple illumination conditions are used. Accordingly, in some cases, a first image in the plurality of images is captured under a first illumination condition and a second image in the plurality of images is captured under a second illumination condition, where the second illumination condition is different than the first illumination condition. The camera system 116 can include at least one illumination source (e.g., the illumination sources 306), and the first illumination condition can include light emitted from the at least one illumination source for capture of one or more images.

In some cases, the second illumination condition is ambient lighting. In a configuration in which the right-side camera 302 is configured to capture images in the visible spectrum and the left-side camera 304 is configured to capture images in the visible/IR wideband (perhaps after having an IR-blocking filter removed), images could be captured using both the right-side camera 302 and the left-side camera 304 in ambient lighting. When that ambient lighting is relatively bright, a right-camera image from the right-side camera 302 and a left-camera image from the left-side camera 304 may look fairly similar to the naked eye. When ambient lighting is relatively dark and no illumination is used, a left-side image from the left-side camera 304 may appear brighter to the naked eye than would a right-side image from the right-side camera 302, since the left-side camera 304 may have gathered some light in the IR spectrum when establishing the left-side image. In cases in which some IR illumination is used in a relatively dark ambient environment, a left-side image may appear noticeably brighter due to the increased amount of IR light from the IR illumination.

That is, in some embodiments, the second illumination condition includes light emitted from at least one illumination source (e.g., one or more of the illumination sources 306) for capture of one or more images. In some embodiments, IR illumination is strobed (e.g., on alternating frames) during capture of the plurality of images, thereby providing controlled illumination and background illumination subtraction in the IR spectrum, improving imaging robustness to ambient lighting conditions without negatively impacting the user experience. In some cases, visible light is emitted from at least one illumination source for capture of one or more images of the biometric-authentication subject.

In some instances, two or more sources of light may be used to illuminate the biometric-authentication subject in a sequence of illumination states. In one example, during a first illumination state, only a first illumination source is turned on, and one or more images are acquired by one or more of the cameras of the camera system 116. During a second illumination state, only a second illumination source is turned on while one or more images are acquired by one or more of the cameras in the camera system 116. In a third illumination state, both sources of illumination may be turned on during image capture. In one embodiment, a sequence of illumination states includes a state that is just ambient illumination and also includes another state that has ambient illumination plus at least one active illuminator.

In at least one embodiment, the active illumination for at least one illumination state utilizes illumination with a non-visible wavelength. In one such example, that non-visible wavelength is in the near-IR spectrum. In another example, near-UV illumination is used. Other non-visible wavelengths may be used as well—in such embodiments, at least one camera in the camera system 116 includes imaging optics configured to be able to acquire images under such illumination. In some embodiments that involve image capture under active illumination, the illumination may include visible light, such as broad-spectrum white light, for example. In one variant, visible light may be pulsed on and off at a rate above what is known as the flicker-fusion frequency of humans (so that it appears to the naked eye to be constantly on) but at a slow enough rate that at least one camera in the camera system 116 can collect separate images with the illumination on and off.

Moreover, the images in the plurality of images of the biometric-authentication subject can vary according to image-capture settings utilized during image capture by one or more cameras of the camera system 116. That is, in at least one embodiment, a first image in the plurality of images is captured using a first camera in the camera system 116, and in particular using a first configuration of one or more image-capture-parameter settings for the first camera. Moreover, in at least one such embodiment, a second image in the plurality of images is captured using either that same camera or another camera in the camera system 116, either way using a second configuration of image-capture-parameter settings that differs as to one or more image-capture parameters from the first configuration of image-capture-parameter settings.

Some example image-capture-parameter settings include exposure time, gain, ISO setting, focal settings, focal stepper motor positions, and/or other optical parameters. In at least one embodiment, multiple images with multiple exposure settings are acquired of the biometric-authentication subject in rapid succession. Moreover, in the case of bright ambient light, either or both imagers may be adjusted via gain and exposure settings to collect usable images.

Moreover, in at least one embodiment that involves a fixed-focus implementation, two different cameras in the camera system 116 use different focal parameters such as focal length, focal distance, field of view, aperture setting, and/or the like for image capture, such that a biometric-authentication subject located at some longitudinal distance from the camera system 116 will produce images that are have different characteristics (e.g., different portions of the respective images will be in focus and different portions will be out of focus). In other embodiments, a focal position of a respective autofocus mechanism on any one or more of the cameras in the camera system 116 can be adjusted to provide multifocal images taken on either the same or different imagers. In at least one embodiment, the plurality of images includes one or more focal stacks, which are respective sets of two or more images of a given scene and/or subject, collected under different focal conditions, captured of the biometric-authentication subject by one or more of the cameras in the camera system 116.

In at least one embodiment, different images in the plurality of images of the biometric-authentication subject are captured under multiple polarization conditions. As described above, the camera system 116 can include at least one illumination source configured to emit light having a first polarization orientation, and can also include at least one camera configured to capture images using a second polarization orientation that differs from the first polarization orientation. As such, the plurality of images in the input-data set can include one or more images captured using a polarization orientation that differs from that of light used to illuminate the biometric-authentication subject during image capture. As stated above, such polarization orientations can be linear or circular, as examples.

As stated above, at step 404, the computer system 104 inputs the input-data set into the machine-learning module 210, which has previously been trained using training data. As stated, the machine-learning module 210 can take the form of software, firmware, and/or hardware. Two example implementations are depicted in FIG. 2A and FIG. 2B. In embodiments in which the machine-learning module 210 is implemented using a hardware component, step 404 may include transmitting the input-data set to the machine-learning module 210. In other embodiments, such as embodiments in which the machine-learning module 210 is implemented in software, step 404 may involve the machine-learning module 210 being called with the input-data set as an input parameter, or may involve the machine-learning module 210 accessing the input-data set from data storage. Other implementations could be used as well.

As stated above, in at least one embodiment, the input-data set includes the plurality of images of the biometric-authentication subject obtained at step 402. In some embodiments, the input-data set is the plurality of images. In other embodiments, the input-data set includes data in addition to the plurality of images. As one example, in some embodiments, the input-data set includes data indicative of one or more of the image-acquisition capabilities of one or more cameras of the camera system 116. This data can include information such as number of cameras, position of cameras, resolution of one or more cameras, focal length of one or more cameras, system type (e.g., webcam, mobile device), system make and model, and/or the like. As another example, in some embodiments, the input-data set includes data indicative of one or more of the image-capture-parameter settings used in connection with the capture of one or more of the images in the plurality of images. Such settings can include exposure time, gain, ISO setting, focal settings, focal stepper motor positions, and/or other optical parameters, as examples.

In at least one embodiment, the plurality of images in the input-data set are submitted to the machine-learning module 210, and a spoof-detection result for the biometric-authentication subject is obtained therefrom, as described below in connection with steps 406 and 408, without the images in the plurality of images undergoing one or more of the image-processing functions that are carried out in current facial spoof-detection and facial-authentication implementations. The image data in the input-data set contains information (e.g., 3-dimensionality, optical properties, and/or the like) that may be considered latent (and/or from latent sources) in that the information is inherently reflected in the data, but has not been extracted or developed, e.g., into one or more data models that in current implementations are analyzed to make spoof-detection and facial-authentication determinations. Indeed, in current implementations, it is typical to explicitly and formally process image data to extract and build a 3D model of a face that is presented as a biometric-authentication subject. That 3D-model-extraction process is difficult and computationally expensive for reasons including the need to assess the data points, do error correction, throw out anomalous values, and the like.

Furthermore, in at least one embodiment, in addition to the 3D characteristics of the imaged subject not being explicitly estimated or calculated (using, e.g., a 3D point cloud), the spectral content of the scene captured in the respective images in the plurality of images is not explicitly estimated or calculated in at least one embodiment. Other examples of estimations, calculations, and/or the like that are not explicitly performed in one or more embodiments include explicitly aligning images, performing motion correction, performing one or more other processing steps typically carried out in the creation of one or more high dynamic range (HDR) images, estimating surface normals of the biometric-authentication subject, and/or the like. It is explicitly noted, however, that one or more of the functions mentioned in this paragraph, the preceding paragraph, or anywhere else in this disclosure as not being performed in at least one embodiment does not rule out that one or more of these functions could be performed in one or more embodiments.

In contrast to current implementations, according to embodiments of the present disclosure, and as described more fully below, one or more neural networks in the machine-learning module 210 are trained using pluralities of so-called raw images that are coupled with data (e.g., labels) indicative of whether a given plurality of raw images corresponds with a biometric-authentication subject that is a spoof specimen or instead with a biometric-authentication subject that is a real face. In various different embodiments, the pluralities of images in this training data reflect some or all of the image-capture variations and permutations described herein, and/or other image-capture variations and permutations.

Any neural network in the machine-learning module 210 may be (e.g., iteratively) trained using techniques such as stochastic gradient descent, back propagation, and/or the like. A given neural network can be trained from scratch or can be adapted from other pretrained networks using methods such as transfer learning. Moreover, in some embodiments, a given neural network has been trained simultaneously, using what is known as multitask training, for one or more other related tasks such as identifying whether, e.g., two different images or sets of images are depicting the same actual real-world face. Such determinations could then be used in performing facial authentication in addition to or instead of spoof detection in various different embodiments.

Moreover, in some embodiments, the pluralities of images used in training and in inference can reflect micro characteristics such as pulsatile motion, which relates to a heartbeat or pulse of a biometric-authentication subject as reflected by arteries and/or veins expanding and/or contracting as blood flows through them. Other micro characteristics could also be reflected in the respective pluralities of images of biometric-authentication subjects used for training and used during inference as well.

Furthermore, in some embodiments of the present disclosure, the pluralities of images used to train one or more neural networks in the machine-learning module 210 include contextual information that, once the neural network or networks have been trained, can then be detected in pluralities of images used during inference to increase accuracy of the respective spoof-detection results provided for respective biometric-authentication subjects. This reflects a recognition that images collected by a facial-recognition system often span a larger field of view than just a face. As such, these images often include body parts such as neck and chest, torso, and the like. Moreover, these images often include depictions of the region of the environment on various different sides of the face. This phenomenon is capitalized on in at least some embodiments.

Indeed, in addition to pluralities of images of facial-authentication attempts that involve real faces, the training data includes pluralities of images captured of various different types of spoofing attempts. In at least some embodiments, this latter category of pluralities of images includes one or more types of spoofing attempts for which the above-mentioned contextual information is helpful in providing accurate spoofing-detection results.

One such example involves a person holding a picture of a face over their real face. The contextual information in the plurality of images in that scenario shows that the scene is not normal with respect to the position of the person's hands, arms, and other features vis-à-vis their face. In another example, a person holds a phone or tablet up to a facial-imaging system with a picture of a face displayed on the device. In some such instances, the contextual information reflects that the images do not contain a torso of the expected size and position relative to the face. As another example, contextual information present in this type of spoofing attempt can show that the supposed background around a face is at the exact same level of focus as the face itself, indicative of a spoofing attempt.

As described below, this trained set of one or more neural networks in the machine-learning module 210 is then used during inference (i.e., the process of generating spoof-detection results in the context of actual facial-authentication attempts). As compared with the above-described current implementations, embodiments of the present systems and methods experience fewer data artifacts and fewer errors. Further aspects of the training and use of one or more neural networks in the machine-learning module 210 in accordance with at least some embodiments are described below.

As stated above, at step 406, the computer system 104 processes the input-data set using the machine-learning module 210 to obtain, from the machine-learning module 210, a spoof-detection result for the biometric-authentication subject. As described above, in at least one embodiment, the machine-learning module 210 includes at least one neural network. In at least one such embodiment, step 406 includes processing the input-data set, which includes the plurality of images of the biometric-authentication subject, using the at least one neural network of the machine-learning module 210. Any given neural network in the machine-learning module 210 could be a deep neural network. Moreover, other machine-learning algorithms may be used." In one embodiment, the machine-learning module implements a random-forest algorithm.

A number of different example neural-network configurations that could be implemented by the machine-learning module 210 in various different embodiments are described below in connection with FIGS. 5-9. In each such case, the input-data set is simplified down to a right-camera image captured by the right-side camera 302 and a left-camera image captured by the left-side camera 304. This is by way of example and not limitation. As described herein, the input-data set could include a different number of images and could also include additional data. It is to be understood that the right-camera image and the left-camera image that are described in connection with each of the example neural-network configurations could represent any of the many image-capture variations and permutations described herein, as examples, and/or any other suitable image-capture variation or permutation. Moreover, multiple cameras could be used to capture images for inclusion in the input-data set of any set of physical perspectives. The description of embodiments having two cameras—a right-side camera and a left-side camera—are provided by way of example.

Figure 5:
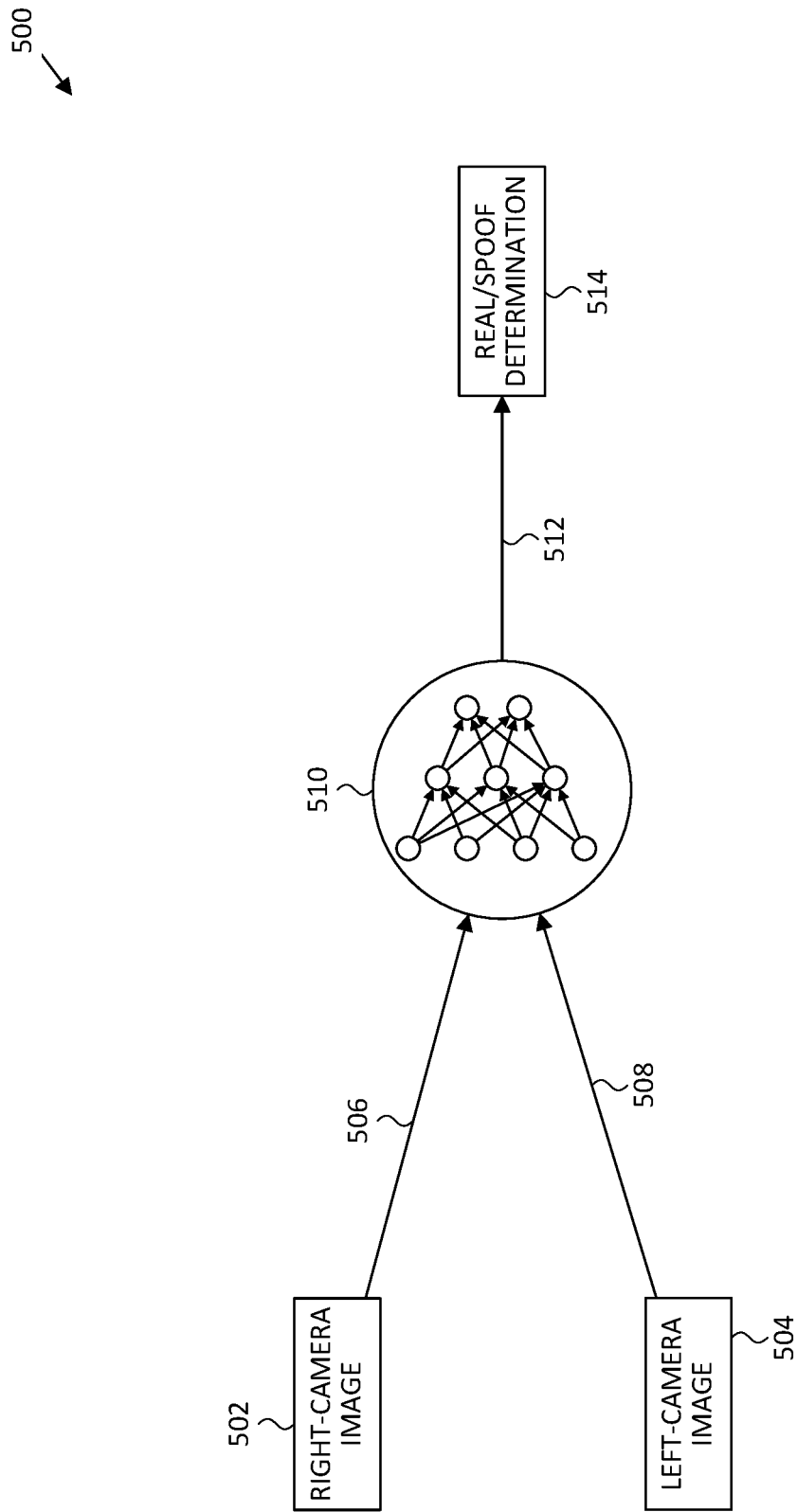
FIG. 5 is a diagram of a first example neural-network configuration, in accordance with at least one embodiment.

FIG. 5 is a diagram of a first example neural-network configuration 500 that could be implemented by the machine-learning module 210 in one or more embodiments. As depicted in the neural-network configuration 500, a right-camera image 502 is input into a neural network 510 as shown at 506, and a left-camera image 504 is input into the neural network 510 as shown at 508. In at least some embodiments, each of the pixels in each of the right-camera image 502 and the left-camera image 504 includes multiple dimensions. For example, each pixel in the right-camera image 502 could include a red-color value, a green-color value, and a blue-color value. As another example, each pixel in the left-camera image 504 could include each of those values as well as an IR-light value (e.g., an IR brightness value). In an embodiment, each such value becomes an input node in the neural network 510.

When processing, the neural network 510 may perform various operations on the various input nodes and thereby produce additional layers of nodes. Each layer of nodes consumes the output (i.e., the feature plane) of the previous layer. Thus, at each layer, the neural network 510 produces features and can have an arbitrary number of features in any given layer. In at least one embodiment, each successive layer includes a greater number of feature planes than the previous layer for a spatially reduced set of nodes. The various operations could be convolutional-kernel type operations that, for each pixel, examine values of neighboring pixels and derive a collective value (e.g., an average value) for that pixel and its neighbors, where that collective value may become a node in the ensuing layer, thus resulting in the above-referenced spatial reduction of the image in each layer as compared with the previous layer. Each neural network described herein may operate substantially in this manner, though with different content and operations, depending on the particular neural network.

As an example embodiment, the neural network 510 may be a convolutional neural network (CNN) configured to operate on a combination of the left and right images, which can be combined together in several different ways. For example, each of the left and right images may be represented as a stack of monochrome images—e.g., for a color imager, the stack may include red, green and blue image channels. As examples, the left and right image stacks may be concatenated together along either of the two spatial dimensions or may be concatenated together along the channel dimension, resulting a 6-channel image stack.

In any case, the first layer of the network may apply an appropriately sized kernel over the input image followed by a nonlinear operation to produce the first set of features. For example, a set of M 3×3×N convolution kernels may be applied to the N input channels to produce M output channels. Further, the convolution may be performed with a step size greater than one. For example, the step size may be set to 2 in each of the spatial dimensions such that the N feature planes then have approximately ¼ the number of elements as compared with the number of pixels in the original image stack.

A nonlinear operation may then be applied to the output planes of the convolution. The nonlinearity may be a sigmoid, a hyperbolic tangent, a rectified linear unit (ReLU) or other such nonlinear functions as known in the art. The resulting stack of M features may then be used as an input into the next layer of the network and be operated on in a similar fashion as the first layer. The number of convolutional layers may be repeated many times, after which the resulting features may be operated on by one or more dense network layers that perform weighted nonlinear summations over all feature elements.

The final layer of the network may have a small number of nodes that correspond to a classification result. For example, in the case of spoof detection, the network may culminate in a single node that produces values that range from 0.0 to 1.0 (e.g., sigmoid) where 0.0 is a strong indicator of a genuine person and 1.0 is a strong indicator of a spoof. Alternatively, such a network may terminate in two nodes that are then used for softmax scaling such that the value of one of the scaled nodes is related to the certainty that the sample is genuine and the other scaled node is related to the certainty that the sample is a spoof. In various different embodiments, the output of the network could take the form of a binary (real/spoof) value, a scalar confidence percentage, a quantized scored (e.g., 1-5), a result from a finite set of possible results such as {real, spoof, unsure}, an array of confidence scores corresponding to various spoof types, and/or one or more other forms. In some embodiments, an output may not be provided until a certainty determination is made, or until a certain level of confidence is reached, or the like.

The network(s) described above may be fully custom or may include some or all of existing network architectures. Some of the architectures that have been described and used to apply to various image-processing tasks include Mobile-Net, MobileNetV2, ResNet, VGG, and Inception, as examples.

As shown at 512, the neural network 510 generates a spoof-detection result 514, which represents a determination made by the neural network 510 as to whether the biometric-authentication subject that is imaged in the right-camera image 502 and the left-camera image 504 is a real face or a spoof specimen.

Figure 6:
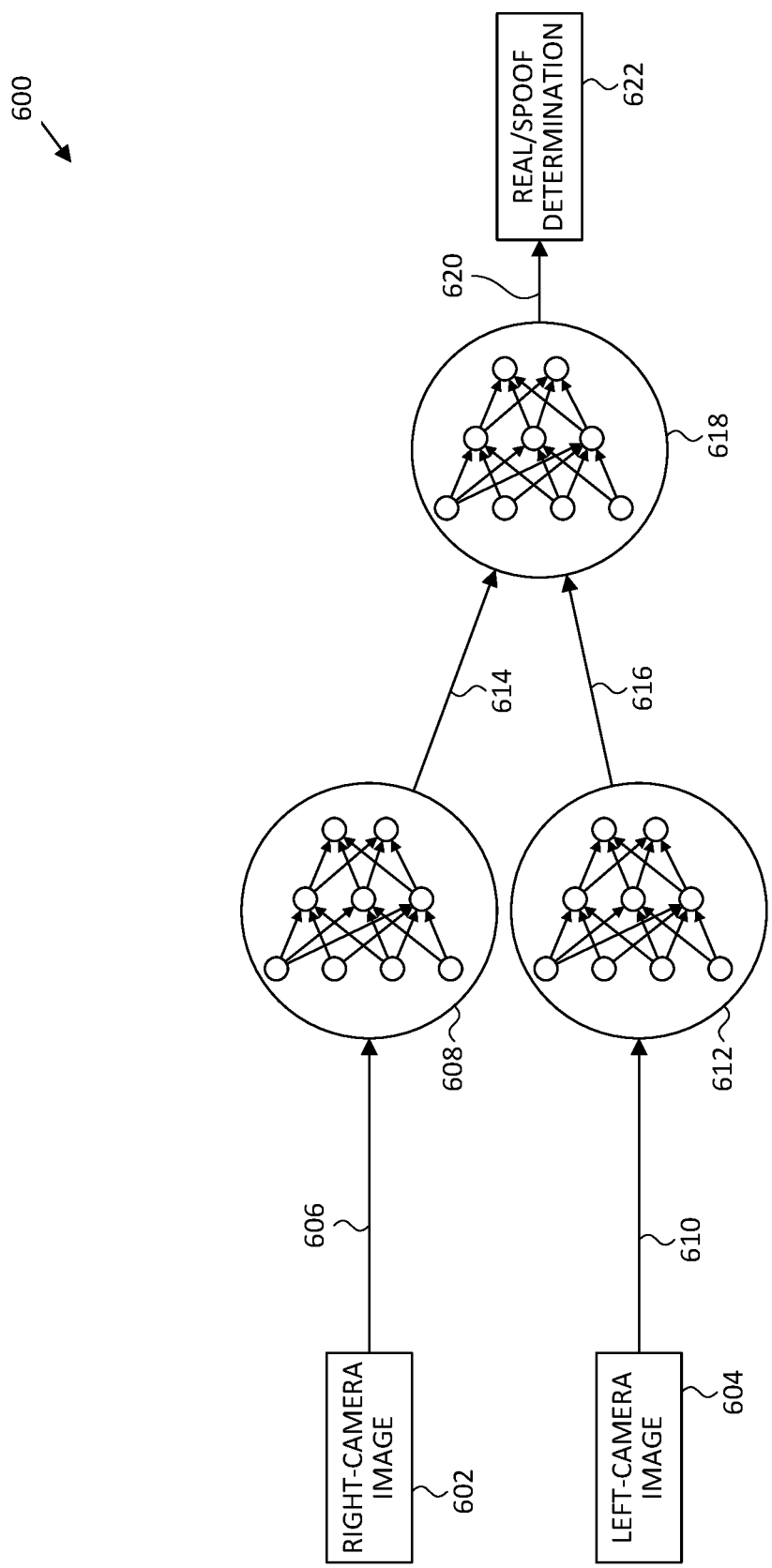
FIG. 6 is a diagram of a second example neural-network configuration, in accordance with at least one embodiment.

FIG. 6 is a diagram of a second example neural-network configuration 600 that could be implemented by the machine-learning module 210 in one or more embodiments. The neural-network configuration 600 is reflective of the fact that, in at least one embodiment, the machine-learning module 210 includes a plurality of neural networks including at least one data-analysis network and a conclusion network. In particular, the neural-network configuration 600 includes three neural networks: two data-analysis networks and a conclusion network 618. The two data-analysis networks are a right-image-processing network 608 and a left-image-processing network 612.

In embodiments in which the machine-learning module 210 includes a neural-network configuration such as the neural-network configuration 600, step 406 could include operations such as processing the right-camera image 602 using the right-image-processing network 608, which would then include a plurality of right-image post-processing nodes 614; processing the left-camera image 604 using the left-image-processing network 612, which would then include a plurality of left-image post-processing nodes 616; inputting the right-image post-processing nodes 614 and the left-image post-processing nodes 616 into the conclusion network 618; processing the right-image post-processing nodes 614 and the left-image post-processing nodes 616 using the conclusion network 618 to obtain (as indicated at 620), from the conclusion network 618, a the spoof-detection result 622.

The right-camera image 602 is input into the right-image-processing network 608 as indicated at 606. The left-camera image 604 is input into the left-image-processing network 612 as indicated at 610. The right-image-processing network 608 and the 610 could each be considered to be an image-processing deep network. Each of those two networks analyzes its respective image independently of the other. Once each is finished processing its respective image, each includes a plurality of post-processing nodes. As described above, after processing the right-camera image 602, the right-image-processing network 608 includes the right-image post-processing nodes 614. Similarly, after processing the left-camera image 604, the left-image-processing network 612 includes the left-image post-processing nodes 616.

Moreover, it is noted that the right-image post-processing nodes 614 and the left-image post-processing nodes 616 are the respective subsets of nodes in their respective networks that are input into the conclusion network 618. As such, either or both networks could include additional post-processing nodes. The right-image post-processing nodes 614 could represent any subset of the post-processing nodes of the right-image-processing network 608, and the left-image post-processing nodes 616 could represent any subset of the post-processing nodes of the left-image-processing network 612.

In some instances, either or both of the right-image post-processing nodes 614 and the left-image post-processing nodes 616 represent the penultimate (i.e., second to last) layer of their respective network. The penultimate layer of either network could have on the order of 100 (e.g., 128) nodes, just as one example. In other instances, a greater or lesser number of nodes could be present in a penultimate layer of a given network. In some instances, a penultimate layer of a given network is the layer of nodes just prior to a predictive output (e.g., spoof-detection result) that the given network has been trained to provide. In some cases, one or both of the right-image post-processing nodes 614 and the left-image post-processing nodes 616 include all of the post-processing nodes of their respective networks.

The conclusion network 618 processes the right-image post-processing nodes 614 and the left-image post-processing nodes 616, and perhaps other input nodes as well, to arrive at a spoof-detection result 622, as indicated at 620. In some embodiments, the conclusion network 618 is a relatively small neural network, perhaps on the order of 2-5 layers. In at least one embodiment, the spoof-detection result 622 is used by the computer system 104 as the spoof-detection result for the biometric-authentication subject. In at least one embodiment, the right-image-processing network 608 and the left-image-processing network 612 are trained independently of one another.

Figure 7:
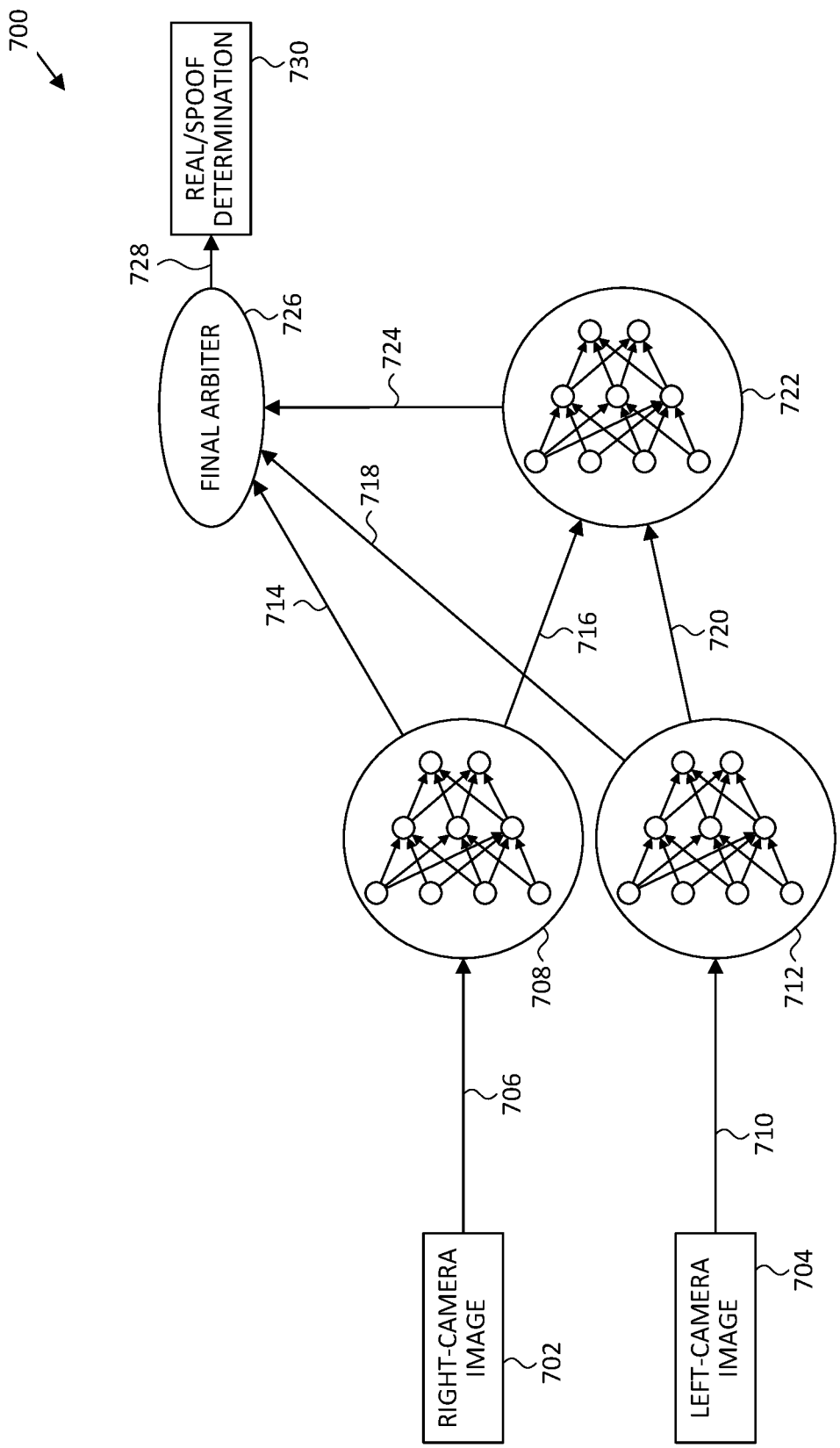
FIG. 7 is a diagram of a third example neural-network configuration, in accordance with at least one embodiment.

FIG. 7 is a diagram of a third example neural-network configuration 700 that could be implemented by the machine-learning module 210 in one or more embodiments. The neural-network configuration 700 of FIG. 7 is similar in many respects to the neural-network configuration 600 of FIG. 6, and therefore is not described in as great of detail. In the neural-network configuration 700, a right-camera image 702 is input at 706 into a right-image-processing network 708, and a left-camera image 704 is input at 710 into a left-image-processing network 712. In various different embodiments, a given right-image-processing network and left-image-processing network could be implemented as the same network or as different networks. In some instances in which they are implemented as different networks, the two networks could be linked so that, for example, the various weights in the two networks remain within a specified range of one another. Similar to FIG. 6, right-image post-processing nodes 716 from the right-image-processing network 708 and a left-image post-processing nodes 720 from the left-image-processing network 712 are input into a conclusion network 722, which processes those nodes and perhaps others. The right-image post-processing nodes 716 and the left-image post-processing nodes 720 could be any suitable subsets of the post-processing nodes of their respective networks.

Unlike in FIG. 6, however, the image-processing networks (i.e., the right-image-processing network 708 and the left-image-processing network 712) also transmit their own respective spoof-detection results (i.e., determinations as to whether their respective image was of a real face or a spoof specimen) to a set of logic referred to herein as a final arbiter 726. Thus, the right-image-processing network 708 transmits a right-image spoof-detection result 714 to the final arbiter 726, and the left-image-processing network 712 transmits a left-image spoof-detection result 718 to the final arbiter 726. Moreover, the conclusion network 722 transmits its spoof-detection result—i.e., a conclusion-network spoof-detection result 724 to the final arbiter 726.

The final arbiter 726 applies any suitable logic to the right-image spoof-detection result 714, the left-image spoof-detection result 718, and the conclusion-network spoof-detection result 724, and then outputs (as indicated at 728) a spoof-detection result 730, which the computer system 104 may use as the spoof-detection result for the biometric-authentication subject. The final arbiter 726 obtains the spoof-detection result 730 based at least in part on the right-image spoof-detection result 714, at least in part on the left-image spoof-detection result 718, and at least in part on the conclusion-network spoof-detection result 724. The final arbiter 726 may weigh these different preliminary spoof-detection results differently. For example, the final arbiter 726 may weigh the right-image spoof-detection result 714 and the left-image spoof-detection result 718 equally with respect to one another, and may weigh the conclusion-network spoof-detection result 724 more heavily than either of the other two, and perhaps equal to or greater than the other two together.

In some embodiments, the final arbiter 726 sets the spoof-detection result 730 equal to "real" only when all three of the received spoof-detection results are equal to "real" (e.g., equal to a Boolean value associated with real, or less than a threshold on a scale from real to spoof, as examples). In some embodiments, the final arbiter 726 sets the spoof-detection result 730 equal to "spoof" only when all three of the received spoof-detection results are equal to "spoof" (e.g., equal to a Boolean value associated with spoof, or greater than a threshold on a scale from real to spoof, as examples). And certainly many other possibilities could be implemented as well.

Figure 8:
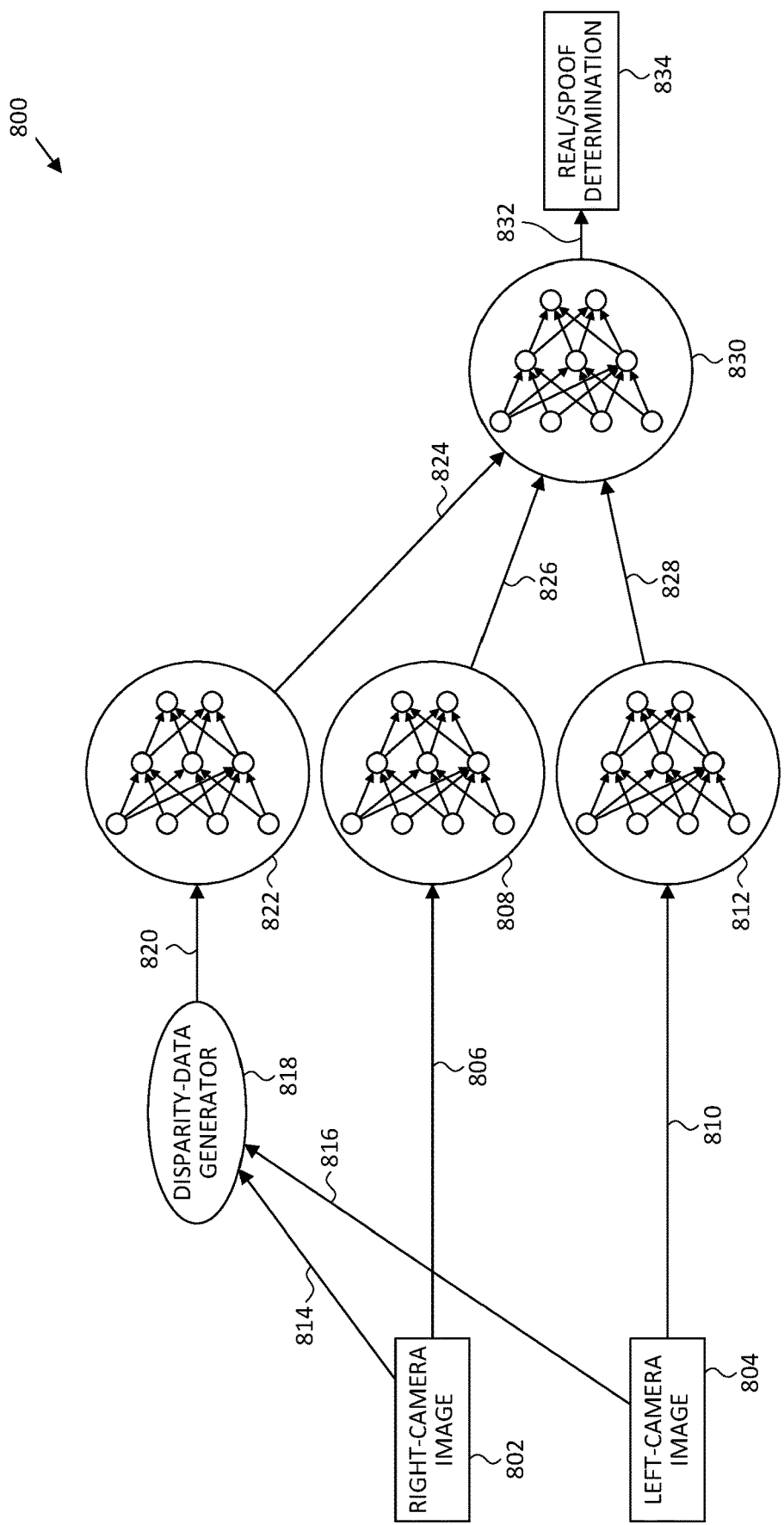
FIG. 8 is a diagram of a fourth example neural-network configuration, in accordance with at least one embodiment.

FIG. 8 is a diagram of a fourth example neural-network configuration 800 that could be implemented by the machine-learning module 210 in one or more embodiments. The neural-network configuration 800 is similar in many respects to the neural-network configuration 600 of FIG. 6, and thus is not described in as great of detail. Similar to FIG. 6, in FIG. 8, a right-camera image 802 is input at 806 into a right-image-processing network 808, and a left-camera image 804 is input at 810 into a left-image-processing network 812. Right-image post-processing nodes 826 are submitted by the right-image-processing network 808 to a conclusion network 830, and left-image post-processing nodes 828 are submitted by the left-image-processing network 812 to the conclusion network 830. In any of FIGS. 6-9, any of the sets of post-processing nodes can represent any subset (e.g., a penultimate layer, all nodes, etc.) of their respective network. Also like FIG. 6, the conclusion network 830 outputs (at 832) a spoof-detection result 834, which the computer system 104 may use as the spoof-detection result for the biometric-authentication subject.

Unlike the neural-network configuration 600 of FIG. 6, the neural-network configuration 800 of FIG. 8 further includes a disparity-data generator 818 and a disparity-data-processing network 822. At 814 and 816, respectively, the right-camera image 802 and the left-camera image 804 are submitted to the disparity-data generator 818. In some embodiments, the disparity-data generator 818 identifies a number of facial landmarks (e.g., right corner of right eye, left corner of mouth, tip of nose, etc.) of a face that is depicted in both the right-camera image 802 and the left-camera image 804 to generate disparity data 820, which the disparity-data generator 818 submits to the disparity-data-processing network 822.

In some embodiments, disparity data takes the form of a set of identified facial landmarks from the two images. Thus, in at least some such embodiments, after a disparity-data generator (e.g., the disparity-data generator 818) identifies (using, e.g., a deep network) a number of facial landmarks in both a right-camera image and a left-camera image, a combined set of identified landmarks (e.g., landmark coordinates) is input into a classification network (referred to herein as a disparity-data-processing network) that has been trained to predict whether such a set of landmarks corresponds with a real face or rather with a spoof attempt. Such embodiments make use of latent information present in the two sets of landmarks without explicitly developing a disparity map, avoiding such intermediate calculations. In other embodiments, a disparity-data generator does perform a stereoscopic analysis on the identified landmarks, and generates a disparity map that is input into a disparity-data-processing network as disparity data (e.g., the disparity data 820).

The disparity data 820 is then processed using the disparity-data-processing network 822, which results in the disparity-data-processing network 822 thereafter including a plurality of disparity-data post-processing nodes 824. The disparity-data post-processing nodes 824 are input into the conclusion network 830 along with the right-image post-processing nodes 826 and the left-image post-processing nodes 828. The conclusion network 830 processes all three of these sets of post-processing nodes, and perhaps other nodes, in obtaining the spoof-detection result 834.

In at least one embodiment, each of the disparity-data-processing network 822, the right-image-processing network 808, and the left-image-processing network 812 are trained independently of one another. Disparity data, which is also referred to as displacement data, is indicative of topography of a face, and is therefore often useful in identifying 2D spoofs such as printed-out or screen-displayed images of faces. Any number of landmarks can be used in a given embodiment. In one example, on the order of five landmarks are used. More or fewer landmarks are used in other embodiments.

Actual faces have a unique topography leading to distinct stereo disparity data that is different than disparity data of faces presented on, as examples, paper or a screen. For a given biometric-authentication subject, the disparity range can be defined as the difference between the points that are substantially the closest to the camera system 116 and those that are substantially the furthest away from the camera system 116. Typically, 2D spoofs have a small disparity range, but it can be significant if, for example, a phone with an image on it is held at an angle with respect to the camera system 116, or closer to one of its cameras than another, as examples. Nevertheless, real faces and 2D spoofs will typically have notably different disparity data. For 2D spoofs, the structure of the data will typically substantially match that of a simple geometric object, for example a plane or the surface of a cylinder. In contrast, the topography a real face cannot be described by simple geometric objects. In at least one embodiment, the disparity-data-processing network 822 is trained to distinguish between 2D faces and 3D faces, and thus identify so-called flat spoofs.

Figure 9:
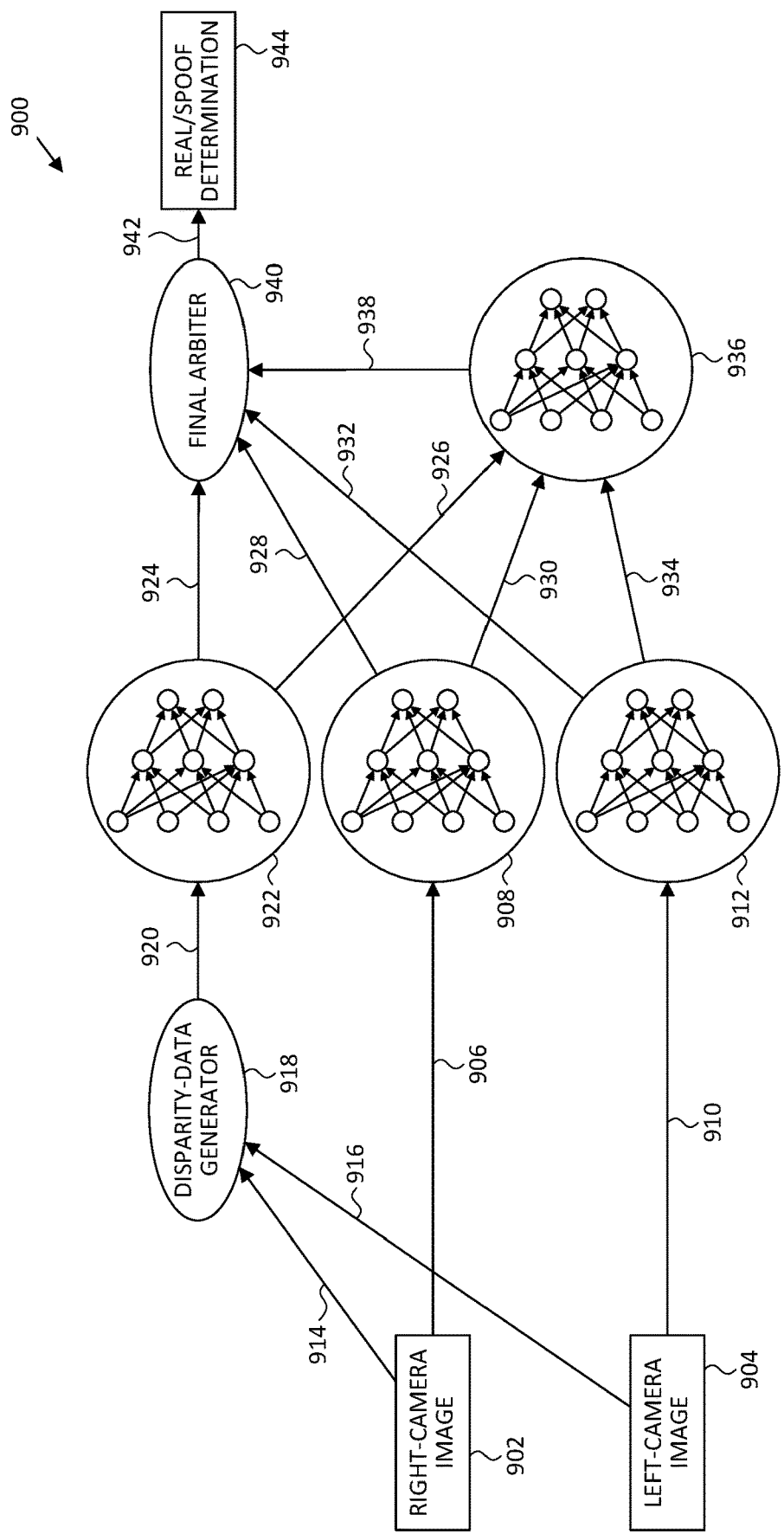
FIG. 9 is a diagram of a fifth example neural-network configuration, in accordance with at least one embodiment.

FIG. 9 is a diagram of a fifth example neural-network configuration 900 that could be implemented by the machine-learning module 210 in one or more embodiments. Essentially, the neural-network configuration 900 of FIG. 9 extends the neural-network configuration 800 of FIG. 8 in the same way that the neural-network configuration 700 of FIG. 7 extends the neural-network configuration 600 of FIG. 6. The neural-network configuration 900 includes a the neural-network configuration 900 similar to how the neural-network configuration 700 includes the final arbiter 726. Both are examples of the face that the machine-learning module 210 can include one or more non-machine-learning (a.k.a. closed-form) components.

In the neural-network configuration 900, a right-camera image 902 is submitted at 906 to a right-image-processing network 908 and at 914 to a disparity-data generator 918. Furthermore, a left-camera image 904 is submitted at 910 to a left-image-processing network 912 and at 916 to the disparity-data generator 918. The disparity-data generator 918 generates disparity data 920 and submits that data to a disparity-data-processing network 922. A conclusion network 936 receives a disparity-data post-processing nodes 926 from the disparity-data-processing network 922, a right-image post-processing nodes 930 from the right-image-processing network 908, and a left-image post-processing nodes 934 from the left-image-processing network 912. The conclusion network 936 processes these nodes and perhaps others, and outputs a conclusion-network spoof-detection result 938 to the final arbiter 940.

The final arbiter 940 also receives a disparity-data spoof-detection result 924 from the disparity-data-processing network 922, a right-image spoof-detection result 928 from the right-image-processing network 908, and a left-image spoof-detection result 932 from the left-image-processing network 912. The final arbiter 940 may apply logic similar to that described above in connection with the final arbiter 726 in order to obtain (at 942) a spoof-detection result 944 based at least in part on the disparity-data spoof-detection result 924, at least in part on the right-image spoof-detection result 928, at least in part on the left-image spoof-detection result 932, and at least in part on the conclusion-network spoof-detection result 938. The computer system 104 may use the spoof-detection result 944 as the spoof-detection result for the biometric-authentication subject.

The final arbiter 940 may weigh these different preliminary spoof-detection results differently. For example, the final arbiter 940 may give the most weight to the conclusion-network spoof-detection result 938, may give a second level of weight to the right-image spoof-detection result 928 and the left-image spoof-detection result 932 equally, and may give a lowest level of weight to the disparity-data spoof-detection result 924.

In some embodiments, the final arbiter 940 sets the spoof-detection result 944 equal to "real" only when all four of the received spoof-detection results are equal to "real" (e.g., equal to a Boolean value associated with real, or less than a threshold on a scale from real to spoof, as examples). In some embodiments, the final arbiter 940 sets the spoof-detection result 944 equal to "spoof" only when all four of the received spoof-detection results are equal to "spoof" (e.g., equal to a Boolean value associated with spoof, or greater than a threshold on a scale from real to spoof, as examples). And certainly many other possibilities could be implemented as well.

In at least one embodiment, all three of the right-image-processing network 908, the left-image-processing network 912, and the disparity-data-processing network 922 are trained independently of one another. In some instances, this approach makes better use of limited training data as compared with training the various neural networks together. This is the case whether or not the spoof-detection results generated by one or more of the networks other than the conclusion network in a given embodiment are explicitly used (e.g., processed using logic by a final arbiter).

In some cases, training these subnetworks independently of one another helps to fine tune the overall solution to being able to accurately detect various types of spoofing attempts. In some embodiments, a separately trained disparity-data-processing network can be used as an initial screen to rapidly detect 2D spoofs. In such embodiments, it is only when such a disparity-data-processing network cannot definitely identify a biometric-authentication subject as being a 2D spoof that further processing (e.g., by left-image and right-image processing networks, and a conclusion network) is conducted.

As stated above, at step 408, the computer system 104 outputs the spoof-detection result for the biometric-authentication subject. It is noted that the method 400 involves making a determination as to whether a given biometric-authentication subject is a spoof specimen or a real face, and the result of this determination is referred to herein as the spoof-detection result for the given biometric-authentication subject.

In some embodiments, the spoof-detection result is a Boolean value—i.e., either true (spoof) or false (real face). In some embodiments, the computer system 104 denies access to at least one service (e.g., unlocking the computer system 104) when the spoofing result is true. In some embodiments, the spoof-detection result is a score in a range of spoof-detection scores (e.g., 0-100, 0-1, or the like), and the computer system 104 denies access to at least one service (e.g., unlocking the computer system 104) based on a comparison of the spoof-detection score with a spoof-detection-score threshold. For example, the computer system 104 may deny access to the at least one service when the spoof-detection score exceeds a threshold, or when the spoof-detection score is equal to or greater than a threshold, or the like.

The cases in which the spoof-detection result is a Boolean true and in which the spoof-detection result is a spoof-detection score that, e.g., exceeds an applicable threshold are collectively referred to below as being cases in which the spoof-detection result is positive—i.e., instances in which the computer system 104 (e.g., an application represented by the instructions 208) has determined that a current facial-authentication attempt is a spoofing attempt. Other cases are referred to a being cases in which the spoof-detection result is negative.

It is further noted that, at step 408, the computer system 104 "outputting" the spoof-detection result for the biometric-authentication subject does not necessarily mean outputting the spoof-detection result for the biometric-authentication subject via the user interface 212 of the computer system 104. That can occur as part of step 408 in cases where the spoof-detection result is positive, as any further analysis to determine whether a presented biometric-authentication subject is actually the user 102 could be considered moot. In cases in which the spoof-detection result is negative, however, further processing may occur in which the same or another application evaluate whether the biometric-authentication subject that has been determined to at least be a real face is actually the real face of the user 102.

In such instances and in all instances, outputting the spoof-detection result can take the form of or include providing an indication of the spoof-detection result to another part of the same application, to another application, to an operating system of the computer system 104, and/or the like. In general, step 408 can take the form of or include outputting the spoof-detection result by transmitting or otherwise providing the spoof-detection result to a receiving entity. In some embodiments, step 408 takes the form of or includes storing the spoof-detection result in memory or other data storage for use by one or more other entities.

As stated above, the method 400 is described herein by way of example and not limitation as being carried out by the computer system 104. As a general matter, however, the present disclosure contemplates embodiments that are carried out entirely on the computer system 104, embodiments that are carried out by a combination of the computer system 104 and one or more other entities (e.g., the server 108), and embodiments that are carried out by one or more entities other than the computer system 104. As but one example, in at least one embodiment, the computer system 104 is used, by way of the camera system 116, to plurality of images of a biometric-authentication subject, and the processing of that plurality of images in order to obtain a spoof-detection result for the biometric-authentication subject is carried out at least in part on the server 108 and/or one or more other computing devices.

Moreover, it is noted that, while primarily described herein in the context of facial authentication, one or more embodiments of the present systems and methods are also applicable to other non-contact biometric-authentication contexts such as fingerprint scanning, hand scanning, palm scanning, retinal scanning, iris scanning, periocular scanning, animal authentication, and/or the like. Moreover, in addition to being applicable to biometric-authentication contexts, one or more embodiments of the present systems and methods are also applicable to non-biometric authentication contexts, perhaps for authenticating inanimate objects such as currency, artwork, jewels, jewelry, identification cards, and/or the like. In general, instead of or in addition to spoof detection, one or more embodiments of the present disclosure are applicable to biometric and/or non-biometric functions such as enrollment, recognition, identification, verification, template generation, authentication, and/or the like.

Furthermore, a number of embodiments are described above that include various neural networks used respectively for functions such as image processing, image pre-processing, disparity-data processing, and the like. It is contemplated that, in some embodiments, a single trained machine-learning module, whether it makes use of one or more neural networks or not, performs one, some, or all of the functions described in various embodiments as being handled by these different neural networks. In some embodiments, a combination of trained machine-learning modules is used. Furthermore, it is possible to combine any number of pre-processing and/or post-processing functions with any one or more trained machine-learning modules to carry out various combinations of the various processing steps described herein.

In some embodiments, the machine-learning module 210 can perform further machine learning based on input-data sets (including images) received and processed during inference. Thus, the machine-learning module can be updated based on such data, to further improve predictive accuracy. Moreover, as stated above, a given input-data set can include data in addition to image data. For example, the additional data could be reflective of non-optical information such as temperature, humidity, time, sound, and/or the like. In some instances, the additional data could include 3D-imaging information such as time-of-flight data. Many other possibilities exist as well. Some further examples include data reflective of the type of system and/or camera(s) used to capture the images, as well as data reflective of camera capabilities and settings, including image-capture settings used to capture images.

IV. Listing of Some Example Embodiments

One embodiment takes the form of a method that includes obtaining an input-data set that includes a plurality of images captured of a biometric-authentication subject by a camera system; inputting the input-data set into a trained machine-learning module; processing the input-data set using the machine-learning module to obtain, from the machine-learning module, a spoof-detection result for the biometric-authentication subject; and outputting the spoof-detection result for the biometric-authentication subject.

In at least one embodiment, the camera system includes a first camera and a second camera that are both configured to capture images in a first light spectrum, and the plurality of images in the input-data set includes at least one image captured by the first camera and at least one image captured by the second camera.

In at least one embodiment, the camera system includes a first camera that is configured to capture images in a first light spectrum and a second camera that is configured to capture images in a second light spectrum, the second light spectrum being different than the first light spectrum, and the plurality of images in the input-data set includes at least one image captured by the first camera in the first light spectrum and at least one image captured by the second camera in the second light spectrum.

In at least one embodiment, the first light spectrum and the second light spectrum overlap.

In at least one embodiment, the first spectrum and the second light spectrum do not overlap.

In at least one embodiment, the camera system includes at least one illumination source configured to emit structured light, and the plurality of images in the input-data set includes at least one image captured with the biometric-authentication subject under illumination of structured light from the at least one illumination source.

In at least one embodiment, a first image in the plurality of images is captured under a first illumination condition and a second image in the plurality of images is captured under a second illumination condition, the second illumination condition being different than the first illumination condition.

In at least one embodiment, the camera system includes at least one illumination source configured to emit light having a first polarization orientation; the camera system includes a first camera configured to capture images using a second polarization orientation, the second polarization orientation being different than the first polarization orientation; and the plurality of images in the input-data set includes at least one image captured by the first camera of the biometric-authentication subject using the second polarization orientation with the biometric-authentication subject under illumination of light having the first polarization orientation from the at least one illumination source.

In at least one embodiment, a first image in the plurality of images is captured using a first focal configuration and a second image in the plurality of images is captured using a second focal configuration, the second focal configuration being different than the first focal configuration.

In at least one embodiment, the machine-learning module includes a neural network, and processing the input-data set using the machine-learning module to obtain, from the machine-learning module, a spoof-detection result for the biometric-authentication subject includes processing the input-data set using the neural network.

In at least one embodiment, the machine-learning module includes a plurality of neural networks, where the plurality of neural networks includes at least one data-analysis network and a conclusion network.

In at least one embodiment, the plurality of images includes a first image captured by a first camera in the camera system and a second image captured by a second camera in the camera system; the at least one data-analysis network includes a first image-processing network and a second image-processing network; and processing the input-data set using the machine-learning module to obtain, from the machine-learning module, the spoof-detection result for the biometric-authentication subject includes processing the first image using the first image-processing network, where the first image-processing network thereafter includes a first plurality of post-processing nodes; processing the second image using the second image-processing network, where the second image-processing network thereafter includes a second plurality of post-processing nodes; inputting the first and second pluralities of post-processing nodes into the conclusion network; processing at least the first and second pluralities of post-processing nodes using the conclusion network to obtain, from the conclusion network, a conclusion-network spoof-detection result; and obtaining the spoof-detection result for the biometric-authentication subject based at least in part on the conclusion-network spoof-detection result.

In at least one embodiment, obtaining the spoof-detection result for the biometric-authentication subject based at least in part on the conclusion-network spoof-detection result includes using the conclusion-network spoof-detection result as the spoof-detection result for the biometric-authentication subject.

In at least one embodiment, the first image-processing network is configured to generate a first-image-processing-network spoof-detection result based on the first image; the second image-processing network is configured to generate a second-image-processing-network spoof-detection result based on the second image; and obtaining the spoof-detection result for the biometric-authentication subject based at least in part on the conclusion-network spoof-detection result includes obtaining the spoof-detection result for the biometric-authentication subject based at least in part on the first-image-processing-network spoof-detection result, at least in part on the second-image processing-network spoof-detection result, and at least in part on the conclusion-network spoof-detection result.

In at least one embodiment, the first camera in the camera system is a right-side camera configured to capture a right-camera view of the biometric-authentication subject; the first image includes a right-camera image of the biometric-authentication subject captured by the right-side camera; the second camera in the camera system is a left-side camera configured to capture a left-camera view of the biometric-authentication subject; and the second image includes a left-camera image of the biometric-authentication subject captured by the left-side camera.

In at least one embodiment, the at least one data-analysis network further includes a disparity-data-processing network, and the method further includes generating disparity data based on the right-camera image and the left-camera image; processing the generated disparity data using the disparity-data-processing network, where the disparity-data-processing network thereafter includes a third plurality of post-processing nodes; and inputting the third plurality of post-processing nodes into the conclusion network, where processing at least the first and second pluralities of post-processing nodes using the conclusion network to obtain, from the conclusion network, the conclusion-network spoof-detection result includes processing at least the first, second, and third pluralities of post-processing nodes using the conclusion network to obtain, from the conclusion network, the conclusion-network spoof-detection result.

In at least one embodiment, the first image-processing network is configured to generate a first-image-processing-network spoof-detection result based on the right-camera image; the second image-processing network is configured to generate a second-image-processing-network spoof-detection result based on the left-camera image; the disparity-data-processing network is configured to generate a disparity-data-processing-network spoof-detection result based on the disparity data; and obtaining the spoof-detection result for the biometric-authentication subject based at least in part on the conclusion-network spoof-detection result includes obtaining the spoof-detection result for the biometric-authentication subject based at least in part on the first-image-processing-network spoof-detection result, at least in part on the second-image-processing-network spoof-detection result, at least in part on the disparity-data-processing-network spoof-detection result, and at least in part on the conclusion-network spoof-detection result.

In at least one embodiment, the first image-processing network, the second image-processing network, and the disparity-data-processing network are trained independently of one another.

Another embodiment takes the form of a system that includes a trained machine-learning module; a processor; and data storage containing instructions executable by the processor for causing the system to carry out a set of functions, where the set of functions includes obtaining an input-data set that includes a plurality of images captured of a biometric-authentication subject by a camera system; inputting the input-data set into the trained machine-learning module; processing the input-data set using the machine-learning module to obtain, from the machine-learning module, a spoof-detection result for the biometric-authentication subject; and outputting the spoof-detection result for the biometric-authentication subject.

Another embodiment takes the form of a non-transitory computer-readable medium containing instructions that, when executed by a processor, cause a computer system to carry out a set of functions, wherein the set of functions includes obtaining an input-data set that includes a plurality of images captured of a biometric-authentication subject by a camera system; inputting the input-data set into a trained machine-learning module; processing the input-data set using the machine-learning module to obtain, from the machine-learning module, a spoof-detection result for the biometric-authentication subject; and outputting the spoof-detection result for the biometric-authentication subject.

What is claimed is:

1. A method comprising:
obtaining an input-data set comprising a plurality of images captured of a biometric-authentication subject by a camera system, the plurality of images comprising a first image captured by a first camera in the camera system and a second image captured by a second camera in the camera system;
inputting the input-data set into a trained machine-learning module, wherein the machine-learning module comprises a plurality of neural networks, the plurality of neural networks comprising at least one data-analysis network and a conclusion network, the at least one data-analysis network comprising a first image-processing network and a second image-processing network;
processing the input-data set using the machine-learning module to obtain, from the machine-learning module, a spoof-detection result for the biometric-authentication subject the processing comprising:
  processing the first image using the first image-processing network, wherein the first image-processing network thereafter comprises a first plurality of post-processing nodes, and wherein the first image-processing network is configured to generate a first-image-processing-network spoof-detection result based on the first image;
  processing the second image using the second image-processing network, wherein the second image-processing network thereafter comprises a second plurality of post-processing nodes, and wherein the second image-processing network is configured to generate a second-image-processing-network spoof-detection result based on the second image;
  inputting the first and second pluralities of post-processing nodes into the conclusion network;
  processing at least the first and second pluralities of post-processing nodes using the conclusion network to obtain, from the conclusion network, a conclusion-network spoof-detection result; and
  obtaining the spoof-detection result for the biometric-authentication subject based:
    at least in part on the first-image-processing-network spoof-detection result, at least in part on the second-image processing-network spoof-detection result, and
at least in part on the conclusion-network spoof-detection result; and
outputting the spoof-detection result for the biometric-authentication subject.

2. The method of claim 1, wherein the first camera and second camera are both configured to capture images in a first light spectrum.

3. The method of claim 1, wherein:
the first camera is configured to capture images in a first light spectrum; and
the second camera is configured to capture images in a second light spectrum, the second light spectrum being different than the first light spectrum.

4. The method of claim 3, wherein the first light spectrum and the second light spectrum overlap.

5. The method of claim 3, wherein the first spectrum and the second light spectrum do not overlap.

6. The method of claim 1, wherein:
the camera system comprises at least one illumination source configured to emit structured light; and
the plurality of images in the input-data set comprises at least one image captured with the biometric-authentication subject under illumination of structured light from the at least one illumination source.

7. The method of claim 1, wherein:
the first image is captured under a first illumination condition; and
the second image is captured under a second illumination condition, the second illumination condition being different than the first illumination condition.

8. The method of claim 1, wherein:
the camera system comprises at least one illumination source configured to emit light having a first polarization orientation;
the first camera is configured to capture images using a second polarization orientation, the second polarization orientation being different than the first polarization orientation; and
the plurality of images in the input-data set comprises at least one image captured by the first camera of the biometric-authentication subject using the second polarization orientation with the biometric-authentication subject under illumination of light having the first polarization orientation from the at least one illumination source.

9. The method of claim 1, wherein:
the first image is captured using a first focal configuration; and
the second image is captured using a second focal configuration, the second focal configuration being different than the first focal configuration.

10. The method of claim 1, wherein:
the first camera is a right-side camera configured to capture a right-camera view of the biometric-authentication subject;
the first image comprises a right-camera image of the biometric-authentication subject captured by the right-side camera;
the second camera is a left-side camera configured to capture a left-camera view of the biometric-authentication subject; and
the second image comprises a left-camera image of the biometric-authentication subject captured by the left-side camera.

11. A system comprising:
a trained machine-learning module;
a processor; and
data storage containing instructions executable by the processor for causing the system to carry out a set of functions, wherein the set of functions comprises:
obtaining an input-data set comprising a plurality of images captured of a biometric-authentication subject by a camera system, the camera system comprising a right-side camera configured to capture a right-camera view of the biometric-authentication subject and a left-side camera configured to capture a left-camera view of the biometric-authentication subject, and the plurality of images comprising a right-camera image of the biometric-authentication subject captured by the right-side camera and a left-camera image of the biometric-authentication subject captured by the left-side camera;
inputting the input-data set into the trained machine-learning module, wherein the machine-learning module comprises a plurality of neural networks, the plurality of neural networks comprising at least one data-analysis network and a conclusion network, the at least one data-analysis network comprising a first image-processing network, a second image-processing network, and a disparity-data-processing network;
generating disparity data based on the right-camera image and the left-camera image;
processing the input-data set and disparity data using the machine-learning module to obtain, from the machine-learning module, a spoof-detection result for the biometric-authentication subject, the processing comprising:
processing the right-camera image using the first image-processing network, wherein the first image-processing network thereafter comprises a first plurality of post-processing nodes;
processing the left-camera image using the second image-processing network, wherein the second image-processing network thereafter comprises a second plurality of post-processing nodes;
processing the disparity data using the disparity-data-processing network, wherein the disparity-data-processing network thereafter comprises a third plurality of post-processing nodes;
inputting the first, second, and third pluralities of post-processing nodes into the conclusion network;
processing at least the first, second, and third pluralities of post-processing nodes using the conclusion network to obtain, from the conclusion network, the conclusion-network spoof-detection result; and
obtaining the spoof-detection result for the biometric-authentication subject based at least in part on the conclusion-network spoof-detection result; and
outputting the spoof-detection result for the biometric-authentication subject.

12. The method of claim 11, wherein:
the first image-processing network is configured to generate a first-image-processing-network spoof-detection result based on the right-camera image;
the second image-processing network is configured to generate a second-image-processing-network spoof-detection result based on the left-camera image;

the disparity-data-processing network is configured to generate a disparity-data-processing-network spoof-detection result based on the disparity data; and obtaining the spoof-detection result for the biometric-authentication subject based at least in part on the conclusion-network spoof-detection result comprises:

obtaining the spoof-detection result for the biometric-authentication subject based:

at least in part on the first-image-processing-network spoof-detection result, at least in part on the second-image-processing-network spoof-detection result, at least in part on the disparity-data-processing-network spoof-detection result, and at least in part on the conclusion-network spoof-detection result.

13. The method of claim 11, wherein the first image-processing network, the second image-processing network, and the disparity-data-processing network are trained independently of one another.

14. A non-transitory computer-readable medium containing instructions that, when executed by a processor, cause a computer system to carry out a set of functions, wherein the set of functions comprises:

obtaining an input-data set comprising a plurality of images captured of a biometric-authentication subject by a camera system, the plurality of images comprising a first image captured by a first camera in the camera system and a second image captured by a second camera in the camera system;

inputting the input-data set into a trained machine-learning module, wherein the machine-learning module comprises a plurality of neural networks, the plurality of neural networks comprising at least one data-analysis network and a conclusion network, the at least one data-analysis network comprising a first image-processing network and a second image-processing network;

processing the input-data set using the machine-learning module to obtain, from the machine-learning module, a spoof-detection result for the biometric-authentication subject, the processing comprising:

processing the first image using the first image-processing network, wherein the first image-processing network thereafter comprises a first plurality of post-processing nodes, and wherein the first image-processing network is configured to generate a first-image-processing-network spoof-detection result based on the first image;

processing the second image using the second image-processing network, wherein the second image-processing network thereafter comprises a second plurality of post-processing nodes, and wherein the second image-processing network is configured to generate a second-image-processing-network spoof-detection result based on the second image;

inputting the first and second pluralities of post-processing nodes into the conclusion network;

processing at least the first and second pluralities of post-processing nodes using the conclusion network to obtain, from the conclusion network, a conclusion-network spoof-detection result; and obtaining the spoof-detection result for the biometric-authentication subject based:

at least in part on the first-image-processing-network spoof-detection result, at least in part on the second-image processing-network spoof-detection result, and at least in part on the conclusion-network spoof-detection result; and outputting the spoof-detection result for the biometric-authentication subject.

* * * * *

UNITED STATES PATENT AND TRADEMARK OFFICE
CERTIFICATE OF CORRECTION

PATENT NO. : 11,294,996 B2
APPLICATION NO. : 16/601851
DATED : April 5, 2022
INVENTOR(S) : Rowe et al.

It is certified that error appears in the above-identified patent and that said Letters Patent is hereby corrected as shown below:

In the Claims

In Column 30, Line 43, in Claim 1, after "subject", insert --,--

In Column 32, Line 61, in Claim 12, delete "method" and insert --system-- therefor In Column 33, Line 17, in Claim 13, delete "method" and insert --system-- therefor Signed and Sealed this
Second Day of July, 2024

Katherine Kelly Vidal
*Director of the United States Patent and Trademark Office*